(12) United States Patent
Ren et al.

(10) Patent No.: US 11,948,315 B2
(45) Date of Patent: Apr. 2, 2024

(54) IMAGE COMPOSITION IN MULTIVIEW AUTOMOTIVE AND ROBOTICS SYSTEMS

(71) Applicant: NVIDIA Corporation, Santa Clara, CA (US)

(72) Inventors: Yuzhuo Ren, Sunnyvale, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 210 days.

(21) Appl. No.: 17/139,587

(22) Filed: Dec. 31, 2020

(65) Prior Publication Data
US 2022/0207756 A1 Jun. 30, 2022

(51) Int. Cl.
*G06T 3/00* (2006.01)
*B60R 1/00* (2022.01)
(Continued)

(52) U.S. Cl.
CPC ............... *G06T 7/33* (2017.01); *B60R 1/00* (2013.01); *G06T 3/14* (2024.01); *G06T 3/4038* (2013.01);
(Continued)

(58) Field of Classification Search
CPC ........... G06T 7/33; G06T 7/90; G06T 7/0002; G06T 7/60; G06T 3/0068; G06T 3/4038; G06T 2207/20084; G06T 2207/20121; G06T 2207/31068; G06T 2207/30252; B60R 1/00; B60R 2300/105; B60R 2300/20; B60R 2300/303;
(Continued)

(56) References Cited

U.S. PATENT DOCUMENTS

| 6,075,905 A | * | 6/2000 | Herman | ............... | H04N 19/597 |
| | | | | | 348/588 |
| 2008/0170804 A1 | * | 7/2008 | Zhang | ................. | H04N 23/698 |
| | | | | | 382/284 |

(Continued)

FOREIGN PATENT DOCUMENTS

WO    WO-2011143622 A2  *  11/2011  ............. F16M 11/04

OTHER PUBLICATIONS

Qureshi et al., "Quantitative Quality Assessment of Stitched Panoramic Images," IET Image Processing, 6(9): 2012, 11 pages.
(Continued)

*Primary Examiner* — Sean T Motsinger
(74) *Attorney, Agent, or Firm* — Davis Wright Tremaine LLP

(57) ABSTRACT

In various examples, two or more cameras in an automotive surround view system generate two or more input images to be stitched, or combined, into a single stitched image. In an embodiment, to improve the quality of a stitched image, a feedback module calculates two or more scores representing errors between the stitched image and one or more input images. If a computed score indicates structural errors in the stitched image, the feedback module calculates and applies one or more geometric transforms to apply to the one or more input images. If a computed score indicates color errors in the stitched image, the feedback module calculates and applies one or more photometric transforms to apply to the one or more input images.

29 Claims, 13 Drawing Sheets

(51) Int. Cl.

| | |
|---|---|
| *G06T 3/14* | (2024.01) |
| *G06T 3/4038* | (2024.01) |
| *G06T 5/50* | (2006.01) |
| *G06T 7/00* | (2017.01) |
| *G06T 7/33* | (2017.01) |
| *G06T 7/60* | (2017.01) |
| *G06T 7/90* | (2017.01) |
| *B25J 9/16* | (2006.01) |
| *H04N 23/90* | (2023.01) |

(52) U.S. Cl.
CPC .............. *G06T 5/50* (2013.01); *G06T 7/0002* (2013.01); *G06T 7/60* (2013.01); *G06T 7/90* (2017.01); *B25J 9/1689* (2013.01); *B60R 2300/105* (2013.01); *B60R 2300/20* (2013.01); *B60R 2300/303* (2013.01); *B60R 2300/804* (2013.01); *B60R 2300/806* (2013.01); *B60R 2300/8093* (2013.01); *G06T 2207/20084* (2013.01); *G06T 2207/20212* (2013.01); *G06T 2207/30168* (2013.01); *G06T 2207/30252* (2013.01); *H04N 23/90* (2023.01)

(58) Field of Classification Search
CPC ........ B60R 2300/804; B60R 2300/806; B60R 2300/8093; B25J 9/1689; H04N 5/247
See application file for complete search history.

(56) References Cited

U.S. PATENT DOCUMENTS

| | | | |
|---|---|---|---|
| 2014/0267593 A1* | 9/2014 | Kim | H04N 23/635 |
| | | | 348/36 |
| 2016/0282599 A1* | 9/2016 | Shankar | G06T 7/33 |
| 2016/0328827 A1* | 11/2016 | Llic | G06T 3/4038 |
| 2018/0262683 A1* | 9/2018 | Meler | G06T 7/13 |
| 2018/0359398 A1* | 12/2018 | Horie | G06T 5/50 |
| 2019/0004512 A1* | 1/2019 | Liu | G05D 1/0038 |
| 2020/0020075 A1* | 1/2020 | Khwaja | G06T 5/002 |
| 2020/0051318 A1 | 2/2020 | Muthler et al. | |
| 2020/0213620 A1* | 7/2020 | Zhao | H04N 13/156 |
| 2020/0238907 A1* | 7/2020 | Watanabe | H04N 7/188 |
| 2021/0366132 A1* | 11/2021 | Minagawa | G06N 20/00 |
| 2022/0101488 A1* | 3/2022 | Noh | G06V 10/62 |
| 2022/0207756 A1* | 6/2022 | Ren | G06T 7/60 |

OTHER PUBLICATIONS

Society of Automotive Engineers On-Road Automated Vehicle Standards Committee, "Taxonomy and Definitions for Terms Related to Driving Automation Systems for On-Road Motor Vehicles," Standard No. J3016-201609, Sep. 30, 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

\* cited by examiner

IMAGE COMPOSITION IN MULTIVIEW AUTOMOTIVE AND ROBOTICS SYSTEMS

BACKGROUND

Automotive systems increasingly employ visualization solutions to assist drivers, provide information, and increase safety. Various techniques to provide visualization in automotive applications suffer various drawbacks. Cameras, for example, are often unable to capture all areas in which safety issues can occur, or all areas which may be of interest to the viewer. Attempts to provide wider fields of view can result in images that are distorted and/or have artifacts, due to inherent camera limitations or characteristics such as position, orientation, and intrinsic parameters. Any distorted visualization or artifacts in automotive visualization increase the difficulty for drivers, other automotive users, safety monitors, and conventional image processing techniques to process information provided by an automotive visualization system, as those artifacts and/or distorted visualization do not reflect the real world. These distortions and/or artifacts potentially reduce driver safety by providing inaccurate or incomplete information.

SUMMARY

Embodiments of the present disclosure relate to improved image composition in automotive or robotic systems using quality assessment feedback. Systems and methods are disclosed to construct improved panoramic images generated in an automotive system or robotic system or platform to facilitate user safety and diagnostic capability. Image composition comprises combining image data from two or more sources, such as cameras, for display in a single visualization engine. That is, captured image data from each individual camera is combined, or stitched, in order to present a whole-landscape view. Conventional composition processes often lead to improper alignment between individual images, creating artifacts and abnormalities obscuring the whole-landscape view, which is especially problematic in vehicle applications where artifacts can appear in safety-critical regions.

Conventional automotive visualization systems are open loop and limited to pairwise composition and may utilize naïve image composition techniques such as homography estimation, which requires estimating correspondence between feature points identified between image data for two individual images. However, because feature points only occur in the presence of distinct objects in a scene, this approach is ineffective for some scenes and produces geometric distortion, where stitched images contain misaligned edges between overlapping portions. In addition, homography estimation produces geometric distortion in scenes with depth.

In contrast to conventional systems, such as those described above, improved image composition in automotive systems utilizes quality assessment feedback in a closed loop composition quality optimization module to guide various adjustments for each image such that artifacts and other distortions are minimized. This composition quality optimization module receives, as input, calibration parameters as well as image data from two or more cameras, and may optionally receive data from other vehicle sensors as well. The composition quality optimization module computes an overlap region for each image pair and based on this overlap region, one or more composition quality scores. If any composition quality score is below a threshold value, a composition quality optimization module calculates and applies one or more geometric or photometric transforms to perform on a subset of the input image data. Based on transformed image data, the composition quality optimization module loops until the one or more composition quality scores are all above or equal to a threshold value. During each loop, the composition quality optimization module computes the one or more composition quality scores and applies one or more geometric or photometric transforms.

BRIEF DESCRIPTION OF THE DRAWINGS

The present systems and methods for improved image composition in automotive systems using quality assessment feedback are described in detail below with reference to the attached drawing figures, wherein.

DETAILED DESCRIPTION

Figure 1:
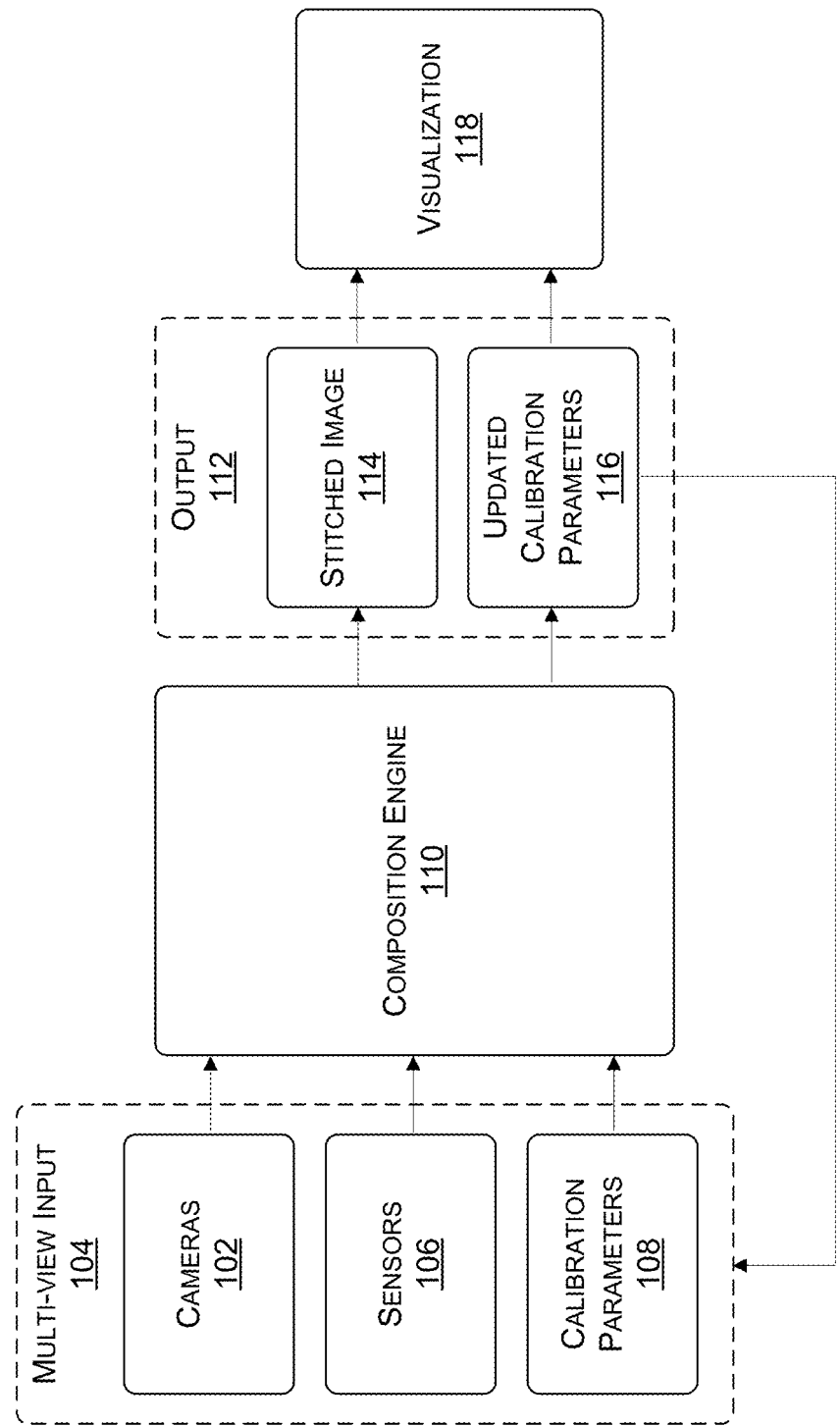
FIG. 1 is a block diagram illustrating a composition pipeline, in accordance with some embodiments of the present disclosure.

Systems and methods are disclosed related to an improved image composition pipeline utilizing quality assessment feedback for use by automotive systems and platforms, or robotics systems and platforms featuring surround view capability.

In multi-view systems, such as those employed in surround view vehicle systems, individual cameras capture images corresponding to a portion of a landscape. That captured image data from each individual camera is combined, or stitched, in order to present a whole-landscape view in a single image via composition of two or more images. Composition is performed using a composition engine or composition pipeline as a component of a surround view vehicle system or any other system in which a plurality of overlapping images must be combined.

When a surround view vehicle system, as further described herein, stitches two or more images captured by vehicle cameras, the resulting image or images are often improperly aligned, containing artifacts and abnormalities obscuring or disrupting the whole-landscape view. Examples of this are further described below in conjunction with FIG. 2A. Conventional approaches to composition images focus on homography estimation to align unstitched images.

Using homography estimation, conventional open loop surround view automotive systems combine overlapping images by estimating correspondence between feature points identified in individual image data. That is, a system implementing homography estimation to perform image composition identifies feature points in each of two images to be combined, and estimates how feature points in each image correspond to each other. Using that correspondence, an overlapping area is identified and images are combined. However, because feature points only occur in the presence of distinct objects in a scene, conventional approaches, such as homography estimation, are ineffective for some scenes and can produce geometric distortion, which manifests when stitched images contain misaligned edges between overlapping portions. In addition, homography estimation produces geometric distortion for whole-landscape views in scenes with depth.

Conventional approaches also have limited applicability, and are only usable for pairwise composition. These conventional approaches cannot be used for multi-view systems, where more than two cameras are used. In addition to limitations of homographic estimation, multi-view systems introduce photometric distortion, where individual cameras have different exposure levels resulting in inconsistent color values across stitched whole-landscape views as further described below in conjunction with FIG. 2A.

By contrast, a closed loop feedback-based approach to perform image composition in automotive systems and platforms, or robotics systems and platforms featuring surround view capability is usable for composition of two or more images in settings where homographic estimation is unusable or introduces a large amount of artifacts. In addition, a feedback-based approach is robust in the face of photometric distortion, able to perform color-correction to match images used as input to an automotive systems and platforms, or robotics systems and platforms featuring surround view capability implementing said feedback-based approach.

A feedback-based approach for image composition in automotive systems and platforms, or robotics systems and platforms featuring surround view capability, as well as other systems requiring image composition, utilizes a closed loop composition quality optimization module to guide geometric adjustment and photometric alignment between two or more stitched images. This composition quality optimization module, as described below in conjunction with FIGS. 4-6, receives as input image data as well as intrinsic and extrinsic calibration parameters from two or more cameras in an automotive systems and platforms, or robotics systems and platforms featuring surround view capability, and may optionally receive data from other vehicle sensors, as further described herein.

Figure 8A:
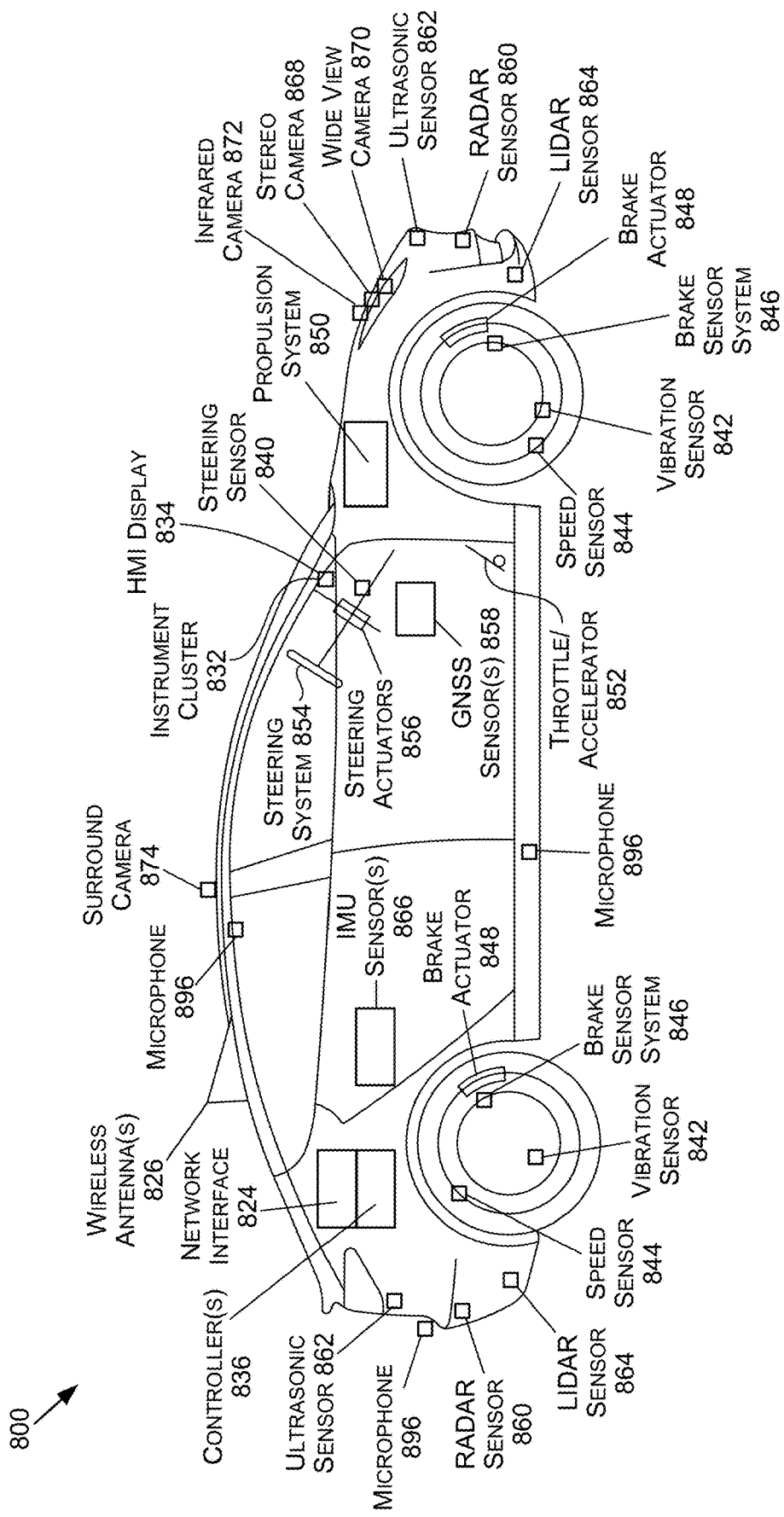
FIG. 8A is an illustration of an example autonomous vehicle, in accordance with some embodiments of the present disclosure.
Figure 8B:
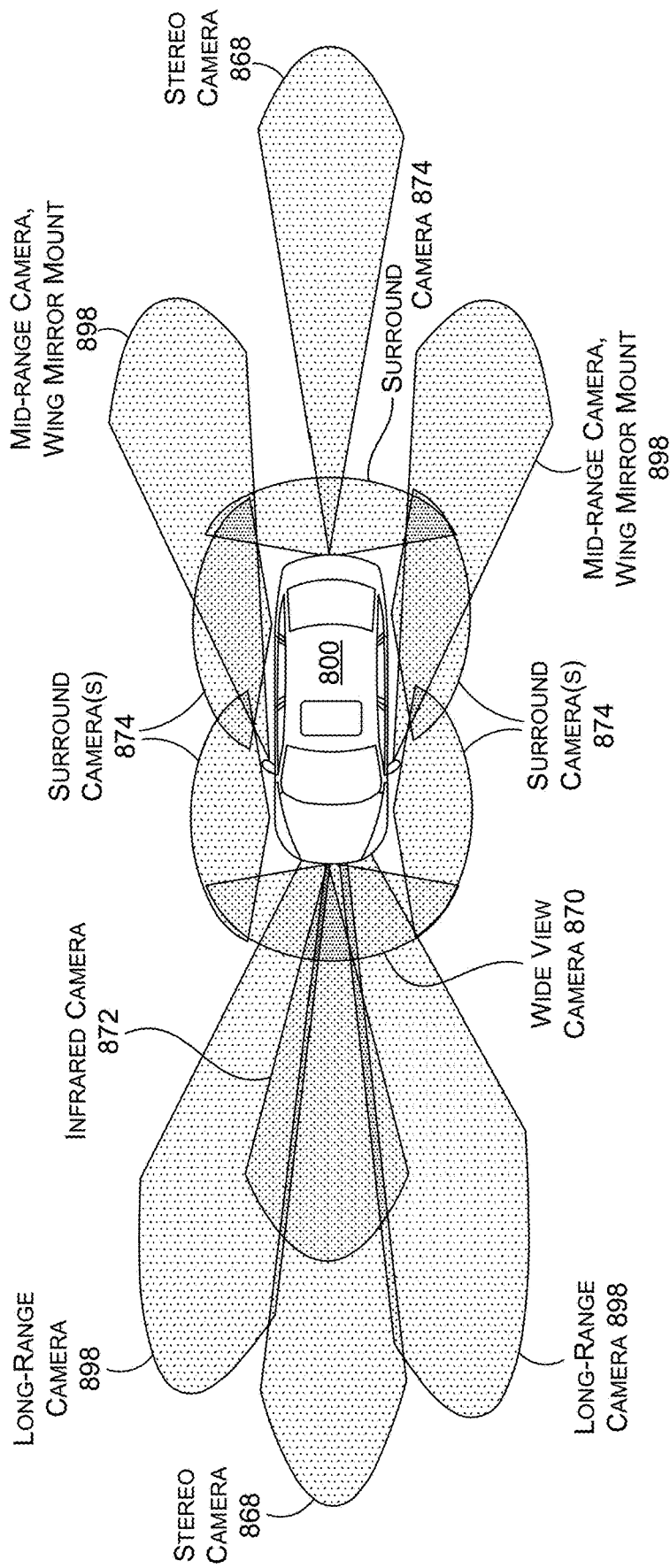
FIG. 8B is an example of camera locations and fields of view for the example autonomous vehicle of FIG. 8A, in accordance with some embodiments of the present disclosure.

Each image in a pair of images is first converted to composition space from fisheye space, as captured from each camera described further herein in conjunction with FIG. 8B. A composition engine or module, as described below in conjunction with FIGS. 1 and 4, then stitches two or more individual images in composition space by projecting each image onto a virtual camera's image coordinate, where the virtual camera represents a stitched or combined pair of images comprising an overlap region. This overlap region is computed for each image pair, and indicates portions of each image from each camera that overlaps in the virtual camera's image space. Based on this overlap region, a composition quality optimization module performs one or more quality assessment operations to compute one or more composition quality scores and determine one or more transforms to be applied to the individual input images of each image pair.

For example, a composition quality optimization module, in an embodiment, performs one or more quality assessment operations to compute a geometric score and a photometric score for each stitched image, as further described below in conjunction with FIG. 6. A geometric score is a numerical value representing a quantity or degree of structural errors created as a result of composition two or more images into a single image by a composition engine, as further described below in conjunction with FIGS. 5 and 6. In an embodiment, a higher geometric score indicates that a stitched image comprises fewer structural errors and closer represents an ideal combination of two images by a composition engine. A lower geometric score indicates that a stitched image comprises more structural errors representing improper composition by a composition engine. A photometric score is a numerical value representing a degree of color difference between two images to be stitched, as further described below in conjunction with FIGS. 2 and 6. In an embodiment, a higher score indicates that each image to be stitched closely resembles others with regard to color properties. A lower score indicates that each image to be stitched comprises significant color property differences.

A composition quality optimization module, as further described below in conjunction with FIG. 5, analyzes both geometric and photometric scores. If, in an embodiment, a geometric score is below a threshold value (indicating poor composition quality), a composition quality optimization module applies geometric alignment. During geometric alignment, a composition quality optimization module computes a 3D transformation, as further described below in conjunction with FIG. 5, to be applied to one or more of the stitched images. In an embodiment, a 3D transformation is a geometric transformation that modifies one or more of the stitched images and adjusts one camera's extrinsic calibration while keeping the other camera's extrinsic calibration unchanged such that a geometric quality matrix is maximized. Once the composition quality optimization module computes the 3D transformation, the composition quality optimization module applies the transformation to produce a maximally aligned stitched or virtual camera image.

If, in an embodiment, a photometric score is below a threshold value (indicating poor color matching between two input images), a composition quality optimization module applies photometric adjustment, as further described below in conjunction with FIG. 5. During photometric adjustment, a composition quality optimization module improves photometric quality by matching color intensity and color angle between input images from two cameras. The composition quality optimization module computes and applies a transform to match a target input image's intensity and angle to a source input image for individual RGB channels, where the transform is based on applying a scaling and offset to color channels of an image. To find optimal scales and offsets, the composition quality optimization module directly searches for values to maximize the photometric score and, as a result, composition quality. To improve performance and reduce the time required to determine optimal scales and offsets, the composition quality optimization module, in an embodiment, reduces search space by computing an initial scale and offset as an average of both the source and target images.

Because automotive systems require real-time performance, a composition quality optimization module utilizes, in an embodiment, an optical flow vector to reduce the search space required to compute a 3D transformation when performing geometric adjustment, as further described below in conjunction with FIG. 5. The reduced search space facilitates real-time determination of the 3D transformation. To reduce search space, the optical flow vector facilitates identification, by the composition quality optimization module, of a direction to rotate an image to improve geometric quality score, thus eliminating any transform that does not rotate the image in that specific direction.

While composition of two images from two cameras in an automotive surround view system is used extensively for the purpose of illustration, it should be noted that the techniques described herein can be adapted for other uses. For example, improved image composition using the various techniques described herein is usable to facilitate improved virtual reality systems, in an embodiment. In another embodiment, improved image composition using the various techniques described herein is usable to facilitate autonomous or semi-autonomous vehicles or other automotive applications where a stitched image is input into a neural network or other machine learning technique used by one of the systems of the car (e.g., control system, emergency braking). Improved image composition using the various techniques described herein is usable, in another embodiment, to improve security camera systems. In another embodiment, improved image composition using the various techniques described herein is usable for medical applications. For example, improved image composition is usable to stitch images and/or video from multiple orthoscopic cameras to give a medical specialist or a robot surgeon an improved view of a whole area around an organ being operated on. In another embodiment, improved image composition using the various techniques described herein is usable to align projectors in cinema or other visualization systems requiring combination of multiple camera views (e.g., IMAX). Construction equipment, in another embodiment, may employ improved image composition using the various techniques described herein is usable, such as by showing an excavator operator the area being dug, perhaps where the view is obstructed by the bucket or other construction equipment component.

Composition techniques described herein are usable, in an embodiment, to facilitate automotive surround view systems comprising more than two cameras generating more than two images to be combined or stitched. In automotive surround view systems comprising three or more cameras generating images to be stitched, the improved image composition pipeline utilizing quality assessment feedback described herein is applied in two different ways, in an embodiment. First, the composition quality optimization module, in an embodiment, may evaluate and improve quality in series for each overlapped region between three or more images to be combined or stitched captured from three or more cameras. Images that are adjusted are used as reference images when adjusting the next overlapped region. Second, the composition quality optimization module, in an embodiment, optimizes composition quality for all overlapped regions between three or more images to be combined or stitched captured from three or more cameras. To optimize geometric quality, the composition quality optimization module summarizes geometric scores for all overlapping regions between images to form an overall geometric score for the stitched image as a whole. Based on this score, the composition quality optimization module searches on each images potential transformation space, as described below in conjunction with FIG. 5, to optimize the overall geometric score. To optimize photometric quality, the composition quality optimization module summarizes the photometric score from all overlapping regions between the three or more input images to form an overall photometric score for the stitched image. Based on this score, the composition quality optimization module searches each input image's scale and offset space to maximize the overall photometric score.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

With reference to FIG. 1, FIG. 1 is an example architecture to perform video and/or image composition, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

FIG. 1 is a block diagram illustrating a composition pipeline or composition block, in accordance with some embodiments of the present disclosure. In a composition pipeline, a composition engine 110 receives multi-view input 104. Multi-view input, in an embodiment, is data such as images from cameras 102, data from sensors 106, and/or calibration parameters 108. In an embodiment, multi-view input 104 comprises cameras 102, such as surround cameras 874, wide view cameras 870, mid-range cameras 898, long range cameras 898, or stereo cameras 868, as further described below in conjunction with FIG. 8B. In an embodiment, cameras 102 are any hardware device to capture image and/or video data. For example, in an embodiment, cameras 102 are fisheye cameras, or comprise fisheye lenses, and generate images having a fisheye projection or perspective. In another embodiment, cameras 102 are any other type of camera to facilitate visualization 118 in automotive surround view systems. Cameras 102 are, in another embodiment, any type of camera to facilitate visualization in systems that perform image composition, as further described herein.

Two or more cameras 102 generate multi-view input 104 images. Images are data generated by one or more cameras 102 representing a position in a field of view, such as the area surrounding a vehicle in an automotive surround view system, in an embodiment. In an embodiment, multi-view input 104 comprises calibration parameters 108. Calibration parameters 108, in an embodiment, are a set of data values usable to configure one or more cameras 102. For example, calibration parameters 108 comprise color, contrast, and brightness levels, in an embodiment. Calibration parameters 108, in another embodiment, are a set of data values associated with other components of an automotive or image capture system, such as sensors 106. Sensors are, in an embodiment, software and/or hardware components to gather data associated with an environment, such as RADAR sensors 860 or LiDAR sensors 864, as further described herein. Calibration parameters 108 comprise intrinsic and extrinsic parameters. In an embodiment, intrinsic parameters are focal length, optical center or principal point, skew coefficients, and/or distortion parameters. Extrinsic parameters, in an embodiment, are camera rotation and translation. For example, extrinsic calibration parameters 108, in an embodiment, comprise position data representing rotation and other geometric adjustments to one or more images from one or more cameras 102. Multi-view input, in an embodiment, comprises two or more images from two or more cameras 102 and calibration parameters 108 associated with the two or more images. Each image, in an embodiment, is associated with its own individual set of calibration parameters 108. In another embodiment, two or more cameras 102 share one or more sets of calibration parameters 108. Calibration parameters 108 may not be available, in an embodiment. If calibration parameters 108 are not available, feature matching techniques, such as homography estimation, are used to estimate the transformation usable to transform two or more multi-view input 104 images into a common stitched space or single image.

A composition engine 110 receives two or more images from cameras 102 and associated calibration parameters 108, as well as optional sensor 106 data, as multi-view input 104. In an embodiment, a composition engine 110 is data values and software instructions that, when executed, combine and align two or more images from two or more cameras 102 into a single image having a common coordinate system. A composition engine 110 receives multi-view input 104 from an ingestion block comprising two or more cameras 102, in an embodiment. In another embodiment, a composition engine 110 receives multi-view input 104 from any grouping or implementation of two or more cameras 102.

Multi-view input 104 comprising images from cameras 102, optional sensor 106 data, and calibration parameters 108 is used by a composition engine to generate output 112 comprising one or more stitched images 114 and updated calibration parameters 116. One or more stitched images 114 are image data generated by a composition engine 110 based, at least in part, on two or more input images from cameras 102. In an embodiment, a stitched image 114 is a 2D image or texture comprising any data format supported by an automotive surround view system further described herein, in an embodiment. A stitched image 114 is a 3D image or texture, in another embodiment.

A composition engine 110 combines or stitches two or more multi-view input 104 images by aligning each multi-view input 104 image onto a common coordinate system as a single image, or stitched image 114, as further described below in conjunction with FIG. 4. In an embodiment, a composition engine 110 aligns two or more multi-view input 104 images into one or more stitched images 114 by aligning said images based on camera calibration parameters 108. In another embodiment, a composition engine 110 aligns two or more multi-view input 104 images into one or more stitched images 114 by identifying one or more features or landmarks and adjusting calibration parameters 108 to align each of the two or more multi-view input 104 images. In another embodiment, a composition engine 110 aligns two or more multi-view input 104 images based, at least in part, on sensor 106 data. A composition engine 110, in another embodiment, utilizes any other technique to align each multi-view input 104 image into an output 112 stitched image 114.

Adjustments made to multi-view input 104 images result, in an embodiment, in updated calibration parameters 116. Updated calibration parameters 116 output 112 by a composition engine 110 comprise data representing new calibration values usable by two or more cameras 102 for further capture of image and/or video data, or to adjust additional components such as sensors 106. In an embodiment, updated calibration parameters 116 comprise adjusted calibration data corresponding to structural or geometric adjustments, such as rotation and translation. In another embodiment, updated calibration parameters 116 comprise adjusted calibration data corresponding to color or photometric adjustments, such as brightness and/or contrast. Updated calibration parameters 116, in an embodiment, comprise both geometric adjustments and photometric adjustments.

A composition engine 110 determines the quality of one or more stitched images, as further described below in conjunction with FIGS. 5 and 6. Based on a quality analysis, the composition engine determines one or more transforms to apply to the multi-view input 104 images in order to generate an optimal output 112 stitched image 114. In an embodiment, a single-pass analysis is made to determine photometric and geometric quality of a stitched image 114 generated by a composition engine 110. In another embodiment, a composition engine 110 performs multiple passes using a feedback mechanism to improve output 112 stitched image 114 quality, as described below in conjunction with FIG. 5. Any adjustments made to the multi-view input 104 images are reflected by the updated calibration parameters 116.

Output 112 comprising one or more stitched images 114 and any updated calibration parameters 116 are utilized by a visualization 118 module, such as a visualization engine or block in an automotive surround view system, in an embodiment. In another embodiment, output 112 from a composition engine 110 is used by any other visualization 118 system to display or otherwise use one or more stitched images 114. In an embodiment, one or more additional transformations are applied by a composition pipeline prior to visualization 118, as further described below in conjunction with FIG. 3.

Figure 2A:
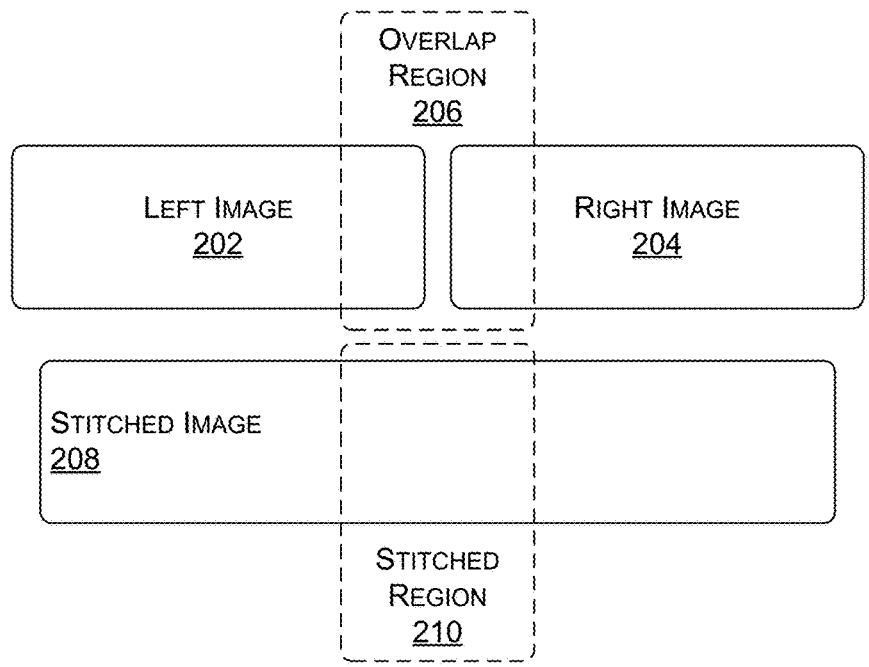
FIG. 2A is an illustration of composition using two images, in accordance with some embodiments of the present disclosure.
Figure 2A:
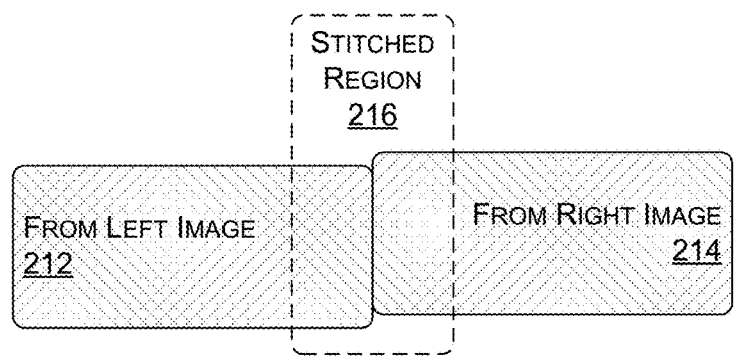
Figure 2A:
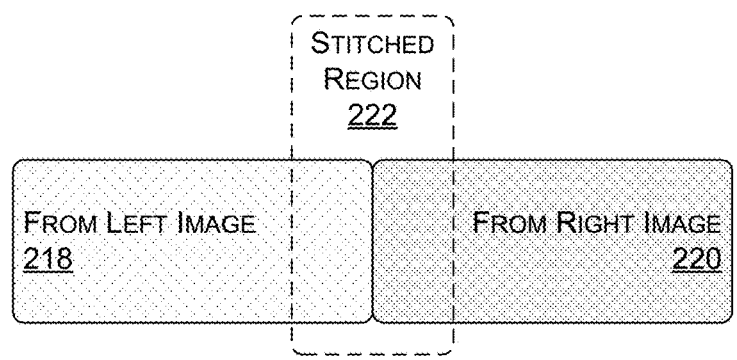

FIG. 2A is an illustration of composition using two images, in accordance with some embodiments of the present disclosure. During composition, two or more cameras capture a left image 202 and a right image 204. In an embodiment, a left image 202 is data comprising a representation of visual information corresponding to a position to the left within a scene, and a right image 204 is data comprising a representation of visual information corresponding to a position to the right within that same scene. In automotive surround view camera system, or other multi-view systems, as described above in conjunction with FIG. 1 and further described herein, the left image 202 and the right image 204 comprise an overlap region 206. In an embodiment, an overlap region 206 is data representing shared projection space within a scene captured by two or more cameras. An overlap region 206, in an embodiment, comprises one or more landmarks or features usable to align the left image 202 and the right image 204. In an embodiment, both the left image 202 and the right image 204 comprise the one or more landmarks or features in the overlap region 206.

A composition engine, such as that described above in conjunction with FIG. 1 and further described below in conjunction with FIGS. 4-6, generates a stitched image 208 based, at least in part, on the left image 202 and the right image 204. In an embodiment, a stitched image 208 comprises a stitched region 210 containing projection information about a scene from the overlap region 206 of the left image 202 and the right image 204. The stitched region 210 is data representing a projection within a scene comprising the overlap region 206 of a left image 202 combined or aligned with the overlap region 206 of the right image 204.

In an embodiment, a stitched region 216 of a stitched image 208 contains geometric errors wherein elements from the left image 212 of the stitched region 216 do not properly align with elements from the right image 214 of the stitched region 216. Geometric errors are quantified by a composition engine using a geometric quality score, as described below in conjunction with FIG. 5. In an embodiment, a stitched region 222 of a stitched image 208 contains photometric errors, where the portion from the left image 218 in the stitched region 222 comprises different color levels in comparison with the portion from the right image 220 in the stitched region 222. Different color levels are quantified by a composition engine using a photometric quality score, as described below in conjunction with FIG. 5. A composition engine calculates or otherwise determines one or more transforms or other adjustments to be applied to the left image 202 and/or the right image 204 based, at least in part, on the geometric quality score and the photometric quality score, as further described below in conjunction with FIGS. 5 and 6.

Figure 2B:
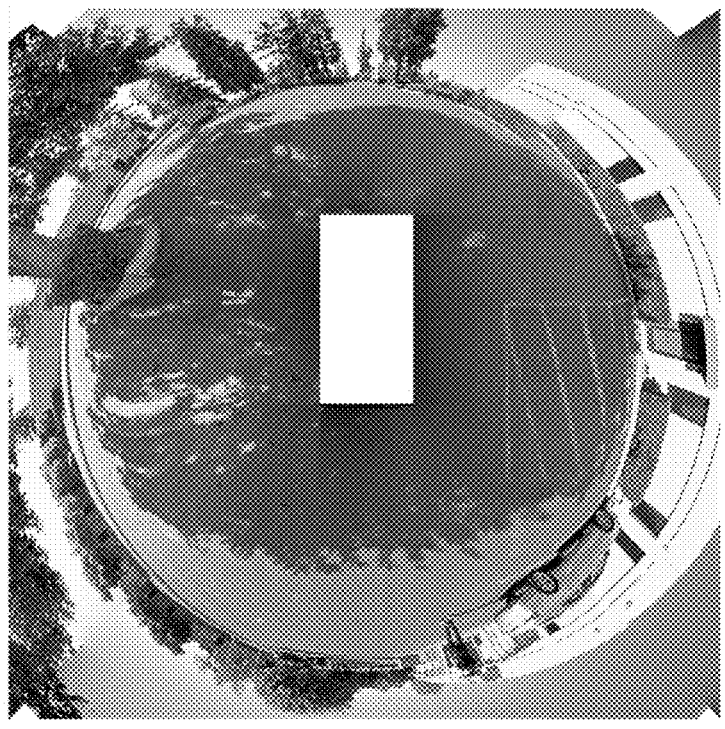
FIG. 2B is an illustration of a bowl-projected image composition before and after optimization, in accordance with some embodiments.
Figure 2B:
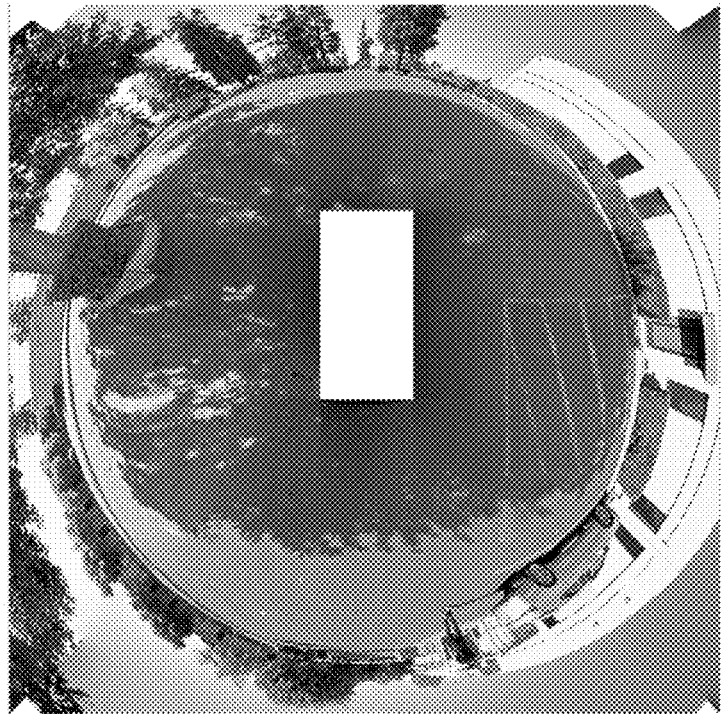

FIG. 2B is an illustration of a bowl-projected image composition before 222 and after 224 optimization, in accordance with some embodiments. A bowl-projected image composition before optimization 222 is a direct composite image comprising several images that have been stitched together by an automotive surround view system. Before optimization, visual artifacts such as misaligned building edges in the upper right quadrant of the bowl-projected image composition 222 are visible. A bowl-projected image composition after optimization 224 is a blended and/or stitched image that corrects for geometric and photometric distortions, using various techniques further described herein. After optimization 224, visual artifacts visible in the bowl-projected image composition before optimization 222 are lessened or not observable.

Figure 3:
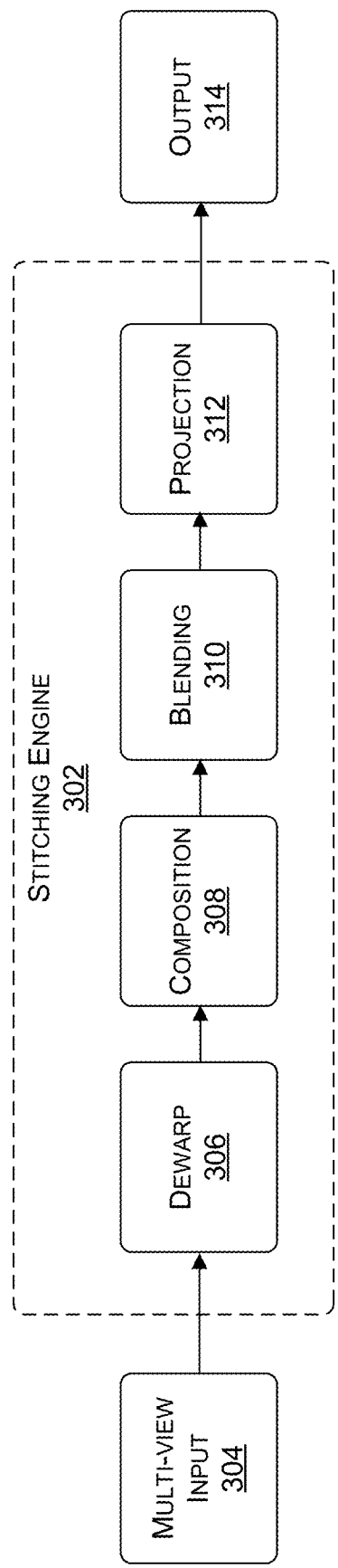
FIG. 3 is a block diagram illustrating a composition engine pipeline, in accordance with some embodiments of the present disclosure.

FIG. 3 is a block diagram illustrating a composition engine 302 pipeline, in accordance with some embodiments of the present disclosure. A composition engine 302 pipeline, such as that illustrated in FIG. 3, is a series of software and/or hardware modules that, when performed, to combine multi-view input 304 images into a single image comprising elements of the multi-view input images 304 to produce a scene. In an embodiment, a composition engine 302 pipeline is a component of an automotive surround view system, as further described herein. In another embodiment, a composition engine is a component of any other visualization system, such as virtual reality or any other application requiring combination of multi-view input 304 into a single output 314 for visualization.

In an embodiment, a composition engine 302 receives, as input, multi-view input 304 from a data ingestion block comprising two or more cameras and calibration parameters, as described above in conjunction with FIG. 1 and further described herein. In another embodiment, a composition engine 302 receives, as input, any other data usable to facilitate image composition.

A composition engine 302 comprises, in an embodiment, a dewarp 306 module or dewarping module. In an embodiment, a dewarp 306 module is data values and software instructions that, when performed, convert multi-view input 304 images from image space to composition space. In an embodiment, image space is a fisheye projection of image data, or is image data comprising fisheye coordinates. In an embodiment, composition space is an equirectangular or equirectangular view projection space. In another embodiment, composition space is rectilinear projection space. Composition space, in an embodiment, is any projection space usable by a composition engine 302 to project, combine, or otherwise use multi-view input 302 images to generate output 314 usable for visualization.

In an embodiment, a dewarp 306 module projects multi-view input 304 from 2D image space to 3D composition space or other projection space using forward mapping. In forward mapping, a dewarp 306 module scans through each multi-view input 304 image pixel by pixel and copies them to an appropriate place in a composition space image. In another embodiment, a dewarp 306 module projects multi-view input 304 from 2D image space to 3D composition space or other projection space using reverse mapping. In reverse mapping, a dewarp 306 module traverses each pixel of a destination composition space image and fetches or samples the correct pixel from one or more multi-view input 304 images. A single point in an image from one input camera maps to an epipolar line in another input camera. Each multi-view input 304 image is projected from a 2D input space to a 3D composition space, where the depth of each pixel is adjustable based on one or more transforms, as described below in conjunction with FIG. 5. In an embodiment, each 2D multi-view input 304 image is mapped onto an initial depth of 0 for regions closer to multi-view camera sensors, as further described herein. In another embodiment, each 2D multi-view input 304 image is mapped onto an initial infinite depth if translation between multi-view input 304 images is small or negligible, or scene depth is far. For example, if each multi-view input 304 camera captures images that contain no overlap or represent a scene at a far distance, no depth adjustment will result in an overlap region for the multi-view input 304 images, and an initial depth is mapped as infinite. In another embodiment, each 2D multi-view input 304 image is mapped onto any depth necessary to represent perspective associated with the multi-view input 304 image. In another embodiment, a dewarp 306 module maps each 2D multi-view input 304 image onto any depth estimated by any sensors or additional methods, LiDAR-based depth estimation, monocular camera-based depth estimation, or multi-view camera based depth estimation. A dewarp 306 module, in an embodiment, maps each 2D multi-view input 304 image onto any depth estimated using any technique to estimate depth available in a surround-view system. A dewarp 306 module, in an embodiment, utilizes one or more calibration parameters received by a composition engine 302 as multi-view input 304. In another embodiment, a dewarp 306 module utilizes no calibration parameters received by a composition engine 302 as multi-view input 304.

A composition engine 302, in an embodiment, comprises a composition 308 module. In an embodiment, a composition 308 module is data values and software instructions that, when performed, combine and align input images, such as camera frames received as a part of multi-view input, into one or more output 314 images having a common coordinate system. In an embodiment, a composition 308 module performs alignment of two or more multi-view input 304 images, such as video frames or camera frames, based on one or more multi-view input 304 calibration parameters. A composition 308 module aligns two or more multi-view input 304 images uses, in an embodiment, feature information from two or more images. In another embodiment, a composition 308 module aligns two or more multi-view input 304 images using disparity-based refinement. In another embodiment, a composition 308 module detects structural artifacts or misalignment and refines calibration parameters to adjust stitched images. To detect structural artifacts or misalignment, a composition 308 module, as further described below in conjunction with FIGS. 4 and 5, utilizes quality analysis and feedback to improve composition quality.

In an embodiment, a composition 308 module combines two or more multi-view input 304 images during 2D to 3D dewarping 306 using reverse mapping. That is, a stitched image representing a 3D virtual camera projection space receives information for each 3D pixel location from each of the two or more multi-view input 304 images. Individual pixels corresponding to multiple multi-view input 304 images are blended together using a blending 310 module. In an embodiment, a blending 310 module is data values and software instructions that, when performed, create a smooth pixel-level transition between two or more multi-view input 304 images combined or projected onto a shared 3D projection space by a composition 308 module. A blending 310 module, in an embodiment, combines pixel data from two or more multi-view input 304 images to generate output pixels. In an embodiment, a blending 310 module combines individual pixel data from a 3D stitched spaced to an output 314 2D image using either forward mapping or reverse mapping, as described above. In another embodiment, a blending 310 module combines data from a plurality of pixels in each of two or more multi-view input 304 images to generate individual or groups of output pixels. In an embodiment, a blending 310 module performs various blending techniques such as alpha or weighted blending, multi-band blending, gradient blending, or optimal cuts. In another embodiment, a blending 310 module performs any other blending technique to combine or otherwise blend pixel data from multi-view input images to achieve a smooth transition between multi-view input images in a stitched output 314 image.

In an embodiment, a composition engine 302 comprises a projection 312 module. A projection 312 module is, in an embodiment, data values and software instructions that, when executed, project stitched image data from composition space, as described above, to a fixed bowl or bowl view projection space. In an embodiment, a projection 312 module generates output 314 usable by a visualization system, as described above in conjunction with FIG. 1. This output 314 comprises data structures, such as image data and calibration parameters, usable to visualize a scene, such as the area around a vehicle in an automotive surround view system.

For example, in an embodiment, output 314 comprises data structures consumed by an embedded visualization system or non-embedded visualization block. These output 314 data structures, in an embodiment, comprise 2D stitched images and/or textures. In another embodiment, the output 314 data structures comprise 3D stitched images and/or textures. Output 314 data structures, in an embodiment, are rectified camera images. In an embodiment, output 314 data structures comprise data that represents a bowl mesh or texture-mesh mapping.

A composition engine pipeline 302, as illustrated in FIG. 3, comprises a plurality of software modules to perform image and/or video composition. A composition engine 302 comprises, in an embodiment, additional modules to facilitate image and/or video composition specific to a system integrating or otherwise utilizing the composition engine 302. For example, a composition engine 302, in an embodiment, comprises one or more reconstruction modules to reconstruct under carriage texture data based on vehicle odometry data in an automotive system. In other systems, various software and/or hardware modules may be used to perform one or more additional steps to facilitate composition engine 302 operations.

Figure 4:
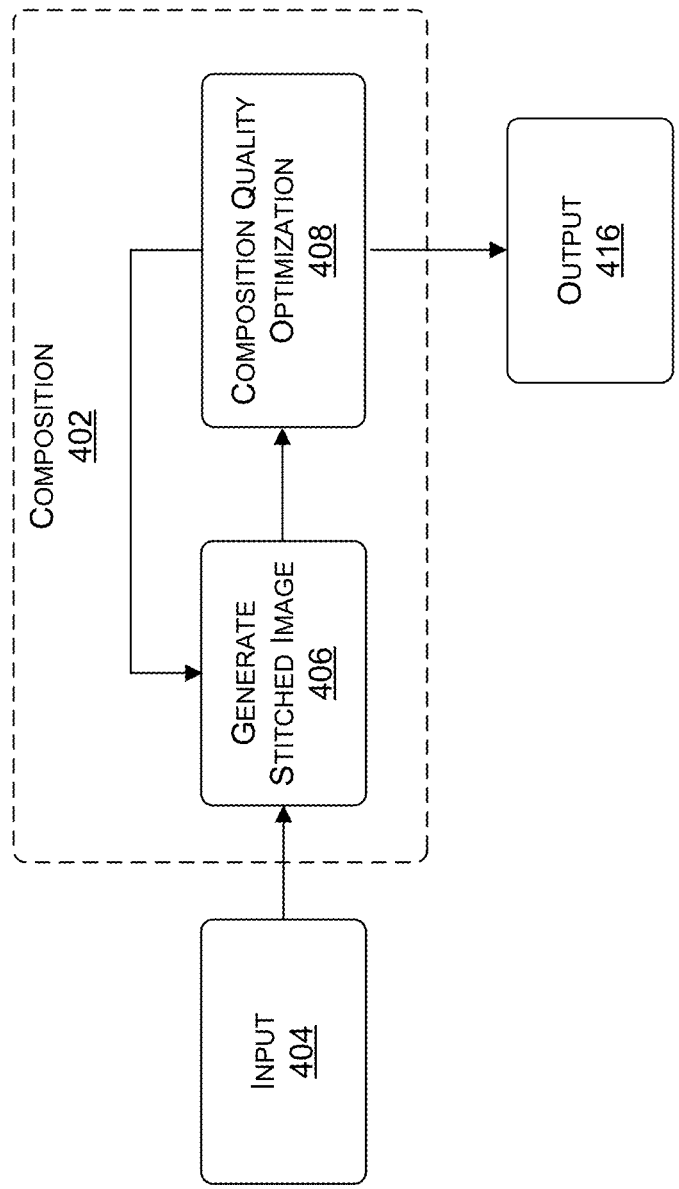
FIG. 4 is a block diagram illustrating a composition module to perform improved image composition, in accordance with some embodiments of the present disclosure.

FIG. 4 is a block diagram illustrating a composition 402 module to perform improved image composition, in accordance with some embodiments of the present disclosure. A composition 402 module receives, as input 404, two or more 2D images received from two or more cameras, in an embodiment. In another embodiment, a composition 402 module receives, as input 404, a 3D virtual camera image comprising combined or stitched image data as a result of a dewarp module performing a reverse mapping between 2D image data from two or more cameras and a 3D virtual camera or projection space.

In an embodiment, a composition 402 module generates a stitched image 406 by performing software instructions that, when executed, convert two or more 2D input images to 3D projection space or composition space using reverse mapping, where each pixel in a 3D projection space is fetched from one or more 2D input images. In another embodiment, a dewarp module, as described above in conjunction with FIG. 3, generates a stitched image and a composition 402 module performs only composition quality optimization 408.

A composition 402 module comprises a composition quality optimization 408 module. In an embodiment, a composition quality optimization 408 module is data values and software instructions that, when performed, calculate one or more quality scores based, at least in part, on a 3D stitched image generated 406 by a composition 402 module, as further described below in conjunction with FIG. 4. In another embodiment, a composition quality optimization 408 module calculates one or more quality scores based, at least in part, on a 3D stitched image generated by a dewarp module and provided as input to a composition 402 module, as described above in conjunction with FIG. 3. A composition quality optimization 408 module, in another embodiment, calculates one or more quality scores based on 2D stitched image input 404 to a composition 402 module or generated 406 by the composition 402 module.

A composition quality optimization 408 module analyzes a 2D or 3D stitched image to generate one or more scores and, if any of the one or more scores are below a threshold value, the composition quality optimization 408 module computes one or more transforms to apply to input 404 images used to generate said 2D or 3D stitched image. In an embodiment, the threshold value used for analyzing scores calculated by the composition quality optimization module is a constant value. In another embodiment, the threshold value used for analyzing scores calculated by the composition quality optimization module is variable. In an embodiment, the threshold is determined using one or more neural network operations to infer an optimal or acceptable threshold value.

A composition quality optimization 408 module, in an embodiment, provides feedback to any module responsible for generating a stitched image 406, such as those described above. This feedback, in an embodiment, is one or more transforms to be applied to one or more 2D input 404 images. In another embodiment, the composition quality optimization 408 module feeds back one or more updated calibration parameters usable by two or more cameras in conjunction with two or more 2D input images.

In an embodiment, a composition quality optimization 408 module outputs a 3D virtual camera projection or stitched image comprising one or more transforms applied to one or more 2D input 404 images. In another embodiment, a composition quality optimization 408 module projects a 3D virtual camera projection or stitched image into a 2D space using reverse mapping and outputs 416 the resulting 2D stitched image.

Figure 5:
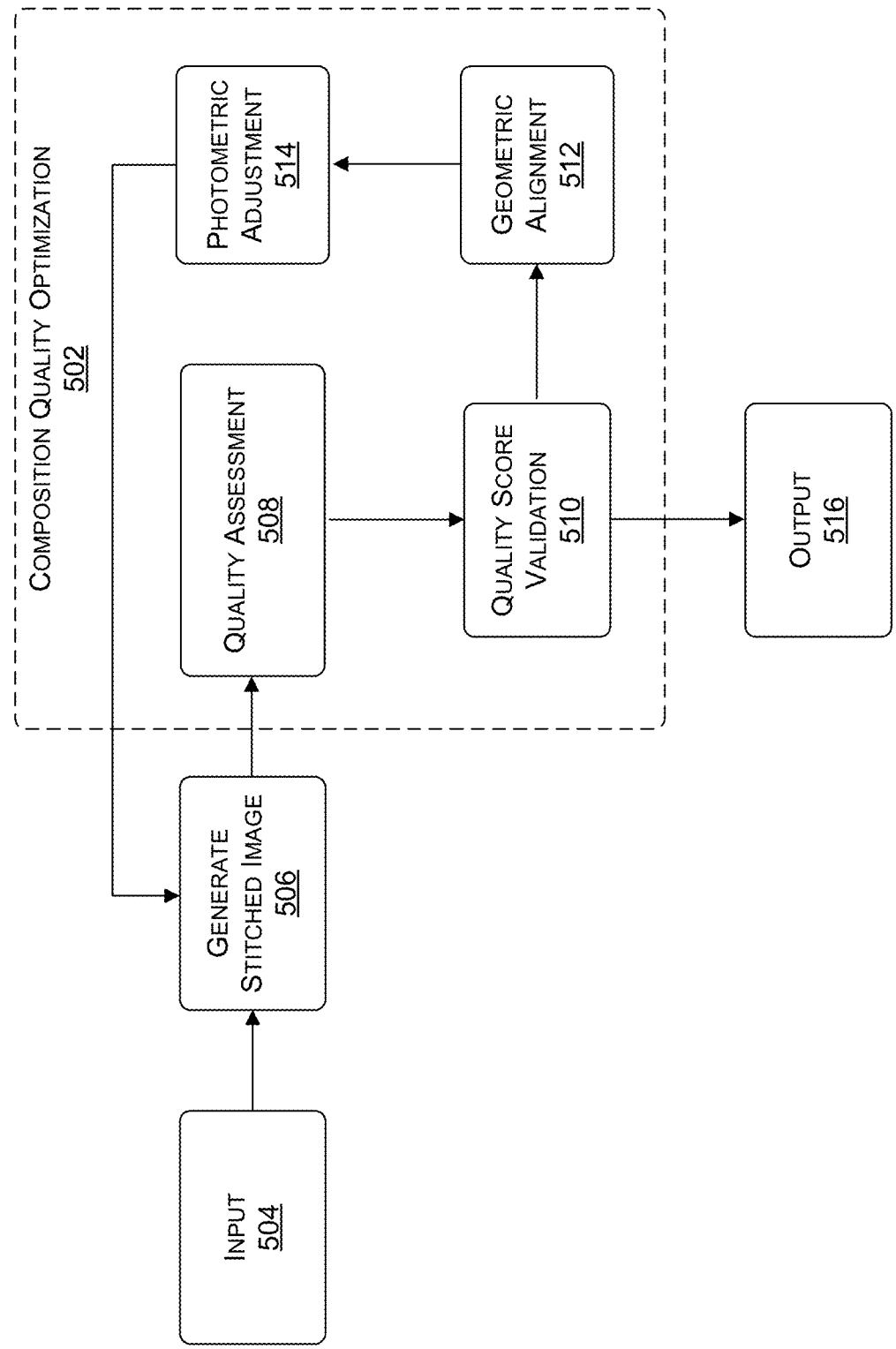
FIG. 5 is a block diagram illustrating a composition quality optimization module, in accordance with some embodiments of the present disclosure.

FIG. 5 is a block diagram illustrating a composition quality optimization module, in accordance with some embodiments of the present disclosure. In an embodiment, a composition quality optimization 502 module receives, as input 504, a 3D stitched image generated 506 using a dewarp module or a composition module, as described above in conjunction with FIGS. 3 and 4. In another embodiment, a composition quality optimization 502 module receives a 2D stitched image as input 504. A composition quality optimization 502 module comprises a quality assessment 508 block. In an embodiment, a quality assessment 508 block is data values and software instructions that, when performed, generate one or more scores as a result of one or more 2D or 3D input images.

A quality assessment 508 block, in an embodiment, generates a geometric quality score. A geometric quality score, as further described below in conjunction with FIG. 6, is a data value indicating how well two or more 2D input 504 images have been stitched 506 into a 2D or 3D stitched image. That is, a geometric quality score $score_{geometric}$, in an embodiment, indicates whether a stitched image contains errors. A quality assessment 508 block computes a geometric quality score $score_{geometric}$ by applying one or more mathematical analyses of 2D and/or 3D input 504 images in conjunction with a 2D or 3D stitched 506 image, as further described below in conjunction with FIG. 6. A quality assessment 508 block computes a geometric quality score $score_{geometric}$ dynamically, in an embodiment, based on image content. Image content, in an embodiment, comprises objects detected by object detectors, lane marking detectors, traffic light detectors, or any other object detection critical to safety and visual quality. For example, a quality assessment 508 block lowers the geometric quality score $score_{geometric}$ when misalignment happens in human-sensitive regions, such as cars, pedestrians, lane markings, or any other visual safety indicator.

A quality assessment 508 block, in an embodiment, generates a photometric quality score $score_{photometric}$. A photometric quality score $score_{photometric}$, as further described below in conjunction with FIG. 6, is a data value indicating how well each color space associated with each input image from two or more cameras matches in a 2D or 3D stitched 506 image. A photometric quality score $score_{photometric}$, in an embodiment, indicates whether colors and/or brightness and contrast levels between input 504 images differ significantly, resulting in a distorted 2D or 3D stitched 506 image. A quality assessment 508 block computes a photometric score $score_{photometric}$ based on a color intensity score and a color angle score, in an embodiment. Given two cameras $c_1$ and $c_2$, a color intensity score is computed as:

$$score_{intensity} = \frac{\min(|c_1|, |c_2|)}{\max(|c_1|, |c_2|)}$$

A color angle score is computed as:

$$score_{angle} = \arccos\left(\frac{\langle c_1, c_2 \rangle}{|c_1||c_2|}\right)$$

In an embodiment, a photometric score $score_{photometric}$ is computed as $score_{photometric} = score_{intensity} + score_{angle}$. In another embodiment, a photometric score is computed using any other combination of $score_{intensity}$ and $score_{angle}$. For both geometric quality score $score_{geometric}$ and photometric quality score $score_{photometric}$, if the value is 1, the 2D or 3D stitched image is an ideal combination of two or more input 504 images. Any value less than 1 indicates differences between a 2D or 3D stitched image and one or more input 504 images from cameras $c_1$ and $c_2$. A value significantly less than 1 indicates significant divergence in the 2D or 3D stitched image from input 504 images from cameras $c_1$ and $c_2$.

In an embodiment, a quality assessment 508 block integrates a temporal consistency score into a composition quality score, such as a geometric score $score_{geometric}$ and/or photometric score $score_{photometric}$. A quality assessment 508 block generates a temporal consistency score by warping stitched images according to other stitched images in a time interval or window. In an embodiment, warping is a transform whereby one or more objects in a first stitched image in time are mapped to one or more locations of the objects in a second stitched image within a time interval. In another embodiment, warping is a transform whereby an entire first stitched image is transformed to match a second stitched image within a time interval. Temporal transforms are performed based, at least in part, on one or more optical flow vectors, as further described herein. To calculate a temporal consistency score, a quality assessment 508 block compares the current stitched image with a warped stitched image from neighborhood frames in a time interval using any mathematical analysis, such as structural similarity index measure (SSIM), described below in conjunction with FIG. 6, for a geometric score integrating temporal consistency or color intensity and angle for a photometric score integrating temporal consistency. For illustrative purposes, a quality assessment 508 block, in an embodiment, uses SSIM to compare the current stitched image with a warped image. In another embodiment, a quality assessment 508 block may use any other mathematical analysis technique further described herein to compare the current stitched image with a warped stitched image.

A composition quality optimization module 502 comprises a quality score validation block 510. In an embodiment, a quality score validation 510 block is data values and software instructions that, when performed, compares one or more quality scores output by a quality assessment 508 block with one or more threshold numerical data values. In another embodiment, a quality score validation 510 block compares one or more quality scores output by a quality assessment 508 block with one or more numerical values computed by a classifier using one or more machine learning techniques, such as neural networks. In an embodiment, one or more machine learning techniques learn a mapping between one or more objective composition quality scores and one or more subjective composition quality scores. In an embodiment, an objective quality score is a score that reflects misalignment overall in a scene captured by one or more images. A subjective quality score is a score that reflects misalignment between objects in a scene captured by one or more images. For example, human vision, in certain scenarios, may place more focus on cars, pedestrians, lane markings, or other obstacles when driving and/or parking. In an embodiment, automotive surround view systems utilizing a composition quality optimization module 502 performing quality assessment 508 focus on misalignment in these human vision focused regions, and utilize one or more machine learning techniques to map an objective quality score to a lower subjective quality score. Various examples of objective and subjective scores are further described below in conjunction with FIG. 6.

If a quality score validation 510 block determines that a geometric quality score $score_{geometric}$ computed by a quality assessment 508 block is below a threshold value, composition quality optimization 502 performs geometric alignment 512. Geometric alignment 512, in an embodiment, is data values and software instructions that, when performed, align unstitched input 504 images to improve the composition quality score $score_{geometric}$. Techniques to perform alignment are, in an embodiment, any techniques to improve composition alignment, such as pixel/feature/depth/disparity-based alignment, improved depth estimation, or any other technique to perform alignment. In an embodiment, geometric alignment 512 computes one or more transforms to adjust a 2D input 504 or part of a 3D stitched 506 image. In another embodiment, geometric alignment 512 computes one or more transforms to adjust calibration parameters associated with a source camera $c_1$ and target camera $c_2$. Geometric alignment 512, in another embodiment, optimizes depth and/or disparity-based alignment to improve alignment. The quality of depth/disparity-based alignment and depth estimation is assessed by the composition quality score $score_{geometric}$, and an alignment or transform or method comprises parameters that are adjusted to optimize the composition quality score $score_{geometric}$.

Composition quality optimization 502 performs geometric alignment 512 by computing a 3D optimal transformation to adjust $c_2$'s extrinsic parameters $\{A_2, [R_2|T_2]\}$ while keeping $c_1$'s extrinsic parameters $\{A_1, [R_1|T_1]\}$ unchanged, where A is an intrinsic parameter and [R|T] is extrinsic rotation and translation. In an embodiment, composition quality optimization 502 during geometric alignment 512 computes the 3D optimal transformation to perform geometric alignment 512 by directly searching the neighborhood of $c_2$'s extrinsic space $[R_2|T_2]$. That is, composition quality optimization 502 searches for rotation and translation adjustments $[R_{optimal}|T_{optimal}]^*$ that, when applied to $c_2$'s extrinsic parameters, result in a maximized $score_{geometric}$. For example, the 3D optimal transformation is computed as:

$$[R_{optimal}|T_{optimal}]^* = \text{argmax } score_{geometric}(\text{search neighborhood of } [R_2, T_2]).$$

where the search neighborhood of $[R_2, T_2]$ is adjustments resulting in $c_2$ being rotated and translated around $c_1$. Composition quality optimization 502 during geometric alignment 512 determines the 3D optimal transform $[R_{optimal}|T_{optimal}]^*$ by calculating individual transforms that result in different $score_{geometric}$ values, and using the transform resulting in the maximal $score_{geometric}$ value.

In another embodiment, composition quality optimization 502 during geometric alignment 512 computes the 3D optimal transformation to perform geometric alignment 512 by reducing search space through an optical flow vector. The relationship between a 3D composition space coordinate M and a projected 2D image space coordinate m is defined as:

$$m = sA([R\ T]M)$$

where s is a scale factor of depth. A geometric alignment 512 block estimates an optical flow vector between a 2D input 504 image from source camera $c_1$ and a 2D input 504 image from target camera $c_2$ using any estimation method, such as phase correlation, block-based methods, differential methods such as Lucas-Kanade or Horn-Schunck, discrete optimization methods, or any other optical flow estimation technique. Once a geometric alignment 512 block estimates an optical flow vector between a 2D input 504 image from source camera $c_1$ and a 2D input 504 image from target camera $c_2$ in a region where the 2D input 504 image from source camera $c_1$ and the 2D input 504 image from target camera $c_2$ overlaps, the 3D transformation $[R_0|T_0]$ of target 2D image from $c_2$ is estimated using the relationship between M and m, as described above. The 3D transform $[R_0|T_0]$ may not achieve an optimal $score_{geometric}$ due to optical flow vector estimation error. As a result, a geometric alignment 512 block applies a confidence value to the optical flow vector and evaluates the neighborhood of 3D transform $[R_0|T_0]$, where the neighborhood of 3D transform $[R_0|T_0]$ represents a reduced search neighborhood of $[R_2|T_2]$. Use of an estimated optical flow vector by a geometric alignment 512 block of composition quality optimization 502 results in guided search direction and reduced search space. The 3D optimal transformation, in an embodiment, is then computed as:

$$[R_{optimal}|T_{optimal}]^* = \text{argmax } score_{geometric}$$
$$(\text{search neighborhood of } [R_0, T_0]).$$

In an embodiment, a 3D optimal transform that integrates temporal consistency into $score_{geometric}$ during optimization is a frame-time 3D volume optimization instead of an individual frame optimization.

If a quality score validation 510 block determines that a photometric quality score $score_{photometric}$ computed by a quality assessment 508 block is below a threshold value, composition quality optimization 502 performs photometric adjustment 514. Photometric adjustment 514, in an embodiment, is data values and software instructions that, when performed, adjust color values between unstitched input 504 images to improve the photometric quality score $score_{photometric}$.

In an embodiment, photometric adjustment 514 attempts to match color intensity and color angle, as described above, between a 2D input 504 image from source camera $c_1$ and a 2D input 504 image from target camera $c_2$ in a region where the 2D input 504 image from source camera $c_1$ and the 2D input 504 image from target camera $c_2$ overlaps. Photometric adjustment 514 computes an optimal transform ($optimal_{scale}^*$, $optimal_{offset}^*$) on individual R, G, and B channels of a 2D image from target camera C2 such that:

$$\text{target image} = optimal_{scale}^* \ast \text{source image} + optimal_{offset}^*$$

In an embodiment, photometric adjustment 514 directly searches offset and scale values such that $$(optimal_{scale}^*, optimal_{offset}^*) = \text{argmax } score_{photometric}$$
$$(\text{scale}, \text{offset})$$

for various values of scale and offset. Photometric quality score SCO is maximized when color values of a 2D input 504 image from source camera $c_1$ is as close to color values of a 2D input 504 image from target camera $c_2$ as possible.

In another embodiment, photometric adjustment 514 reduces search space to improve performance by computing an initial scale and initial offset to start searching using the above equation. Initial scale is computed during photometric adjustment 514 as:

$$scale = \frac{std(\text{target image})}{std(\text{source image})}$$

Initial offset is computed during photometric adjustment 514 as:

offset=mean(target image)−scale*mean(source image)

Figure 6:
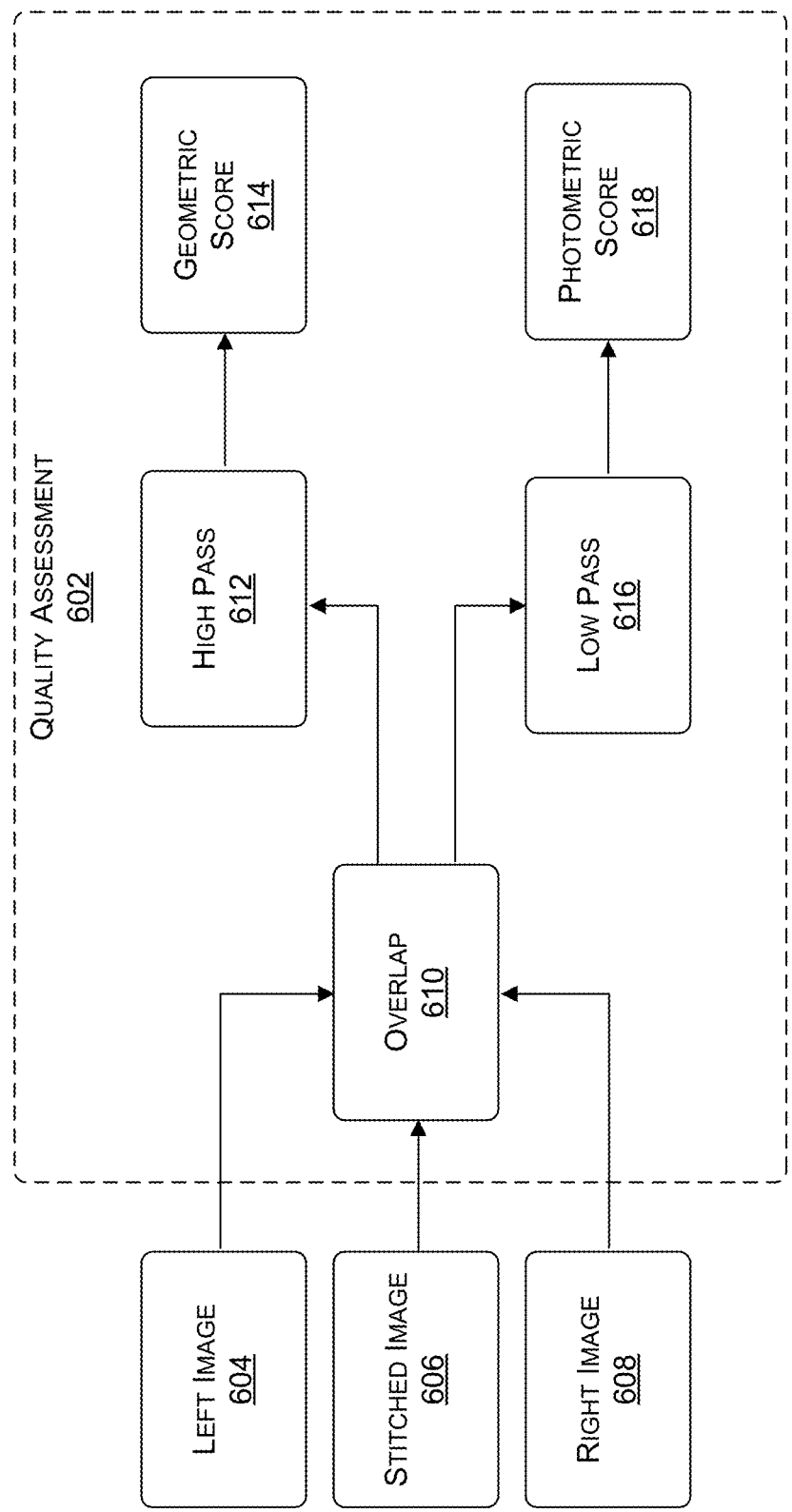
FIG. 6 is a block diagram illustrating a quality assessment module, in accordance with some embodiments of the present disclosure.

In an embodiment, if a quality score validation 510 block in a composition quality optimization 502 module determines that all quality scores, as described above and further described below in conjunction with FIG. 6, are above a threshold value, the composition quality optimization 502 module outputs 516 an optimized 3D stitched image to a projection block, as described above in conjunction with FIG. 3. In another embodiment, if a quality score validation 510 block determines that one or more quality scores, such as $score_{geometric}$ or $score_{photometric}$, or both $score_{geometric}$ and $score_{photometric}$, are above a threshold value, the composition quality optimization 502 module outputs 516 an optimized 3D stitched image to a projection block.

FIG. 6 is a block diagram illustrating a quality assessment 602 block, in accordance with some embodiments of the present disclosure. A quality assessment 602 block computes one or more quality scores 614, 618 associated with an input stitched image 606, as described above in conjunction with FIG. 5. In an embodiment, a quality assessment 602 block computes one or more quality scores 614, 618 based, at least in part, on a comparison between a left image 604 and a stitched image 606 or a right image 608 and a stitched image 606. In another embodiment, a quality assessment 602 block computes one or more quality scores 614, 618 based, at least in part, on a comparison between a left image 604 and a right image 608. A quality assessment 602 block computes one or more quality scores 614, 618, in an embodiment, using a left image 604, a right image 608, and a stitched image 606. In an embodiment, a left image 604 is data representing a 2D input image from a left-oriented camera $c_L$, as further described herein. In an embodiment, a right image 608 is data representing a 2D input image from a right-oriented camera $c_R$.

A quality assessment 602 block computes an overlap 610 between two or more input images 604, 608 using a stitched image 606. In an embodiment, an overlap 610 is data comprising information about a region in which a left image 604 and a right image 608 share coordinate space in a stitched image 606. A coordinate space, in an embodiment, is a 3D projection space or virtual camera space. In another embodiment, a coordinate space is a 2D projection space. A coordinate space, in an embodiment, comprises overlap 610 information from both a left image 604 and a right image 608. In another embodiment, a coordinate space comprises overlap 610 information from either a left image 604 or a right image 608.

In an embodiment, a quality assessment 602 block performs a high pass 612 operation to compute a geometric score 614, or geometric quality score $score_{geometric}$ as described above in conjunction with FIG. 5. A high pass 612 operation, in an embodiment, is data values and software instructions that, when performed, calculate a geometric score 614 using one or more mathematical analysis techniques, including objective quality metrics and/or subjective quality metrics. In an embodiment, a high pass 612 operation determines an objective quality metric and calculates a geometric score 614 by averaging high frequency structural similarity index measure (SSIM) between a left image 604 or a right image 608 and a stitched image 606. SSIM is a perception-based model that considers image degradation as perceived change in structural information while also incorporating important perceptual phenomena, such as luminance masking and contrast masking terms. In another embodiment, a high pass 612 operation determines an objective quality metric and calculates a geometric score 614 by generating a perceptual quality significance map (PQSM) between a left image 604 or a right image 608 and a stitched image 606. PQSM is an array whose elements represent the relative perceptual-quality significance levels for the corresponding area and/or regions between images. A high pass 612 operation calculates, in an embodiment, a geometric score 614 using root mean square error (RMSE), peak signal to noise ratio (PSNR), or any other objective quality metric usable to quantify differences between a left image 604 or a right image 608 and a stitched image 606. In another embodiment, a high pass 612 operation calculates a geometric score 614 using any subject quality metric, such as mean opinion score.

In an embodiment, a quality assessment 602 block performs a low pass 616 operation to compute a photometric score 618, or photometric quality score $score_{photometric}$ as described above in conjunction with FIG. 5. A low pass 616 operation, in an embodiment, is data values and software instructions that, when performed, calculate a photometric score 618. In an embodiment, a low pass 616 operation calculates a photometric score 618 as described above in conjunction with FIG. 5. In another embodiment, a low pass 616 operation calculates a photometric score 618 based, at least in part, on a spectral angle mapper (SAM) to determine photometric color quality and/or an intensity magnitude ratio (IMR) to determine photometric intensity quality. A low pass 616 operation calculates a photometric score 618, in an embodiment, using any other technique usable to quantify color differences between a left image 604 or a right image 608 and a stitched image 606. In an embodiment, a low pass 616 operation calculates a photometric score 618 based on a color space, such as RGB, CIELAB, CMYK, YIQ, YCbCr, YUV, HSV, HSL, or any other color space usable by a left image 604 and a right image 608 captured by two or more cameras, as further described herein.

Figure 7:
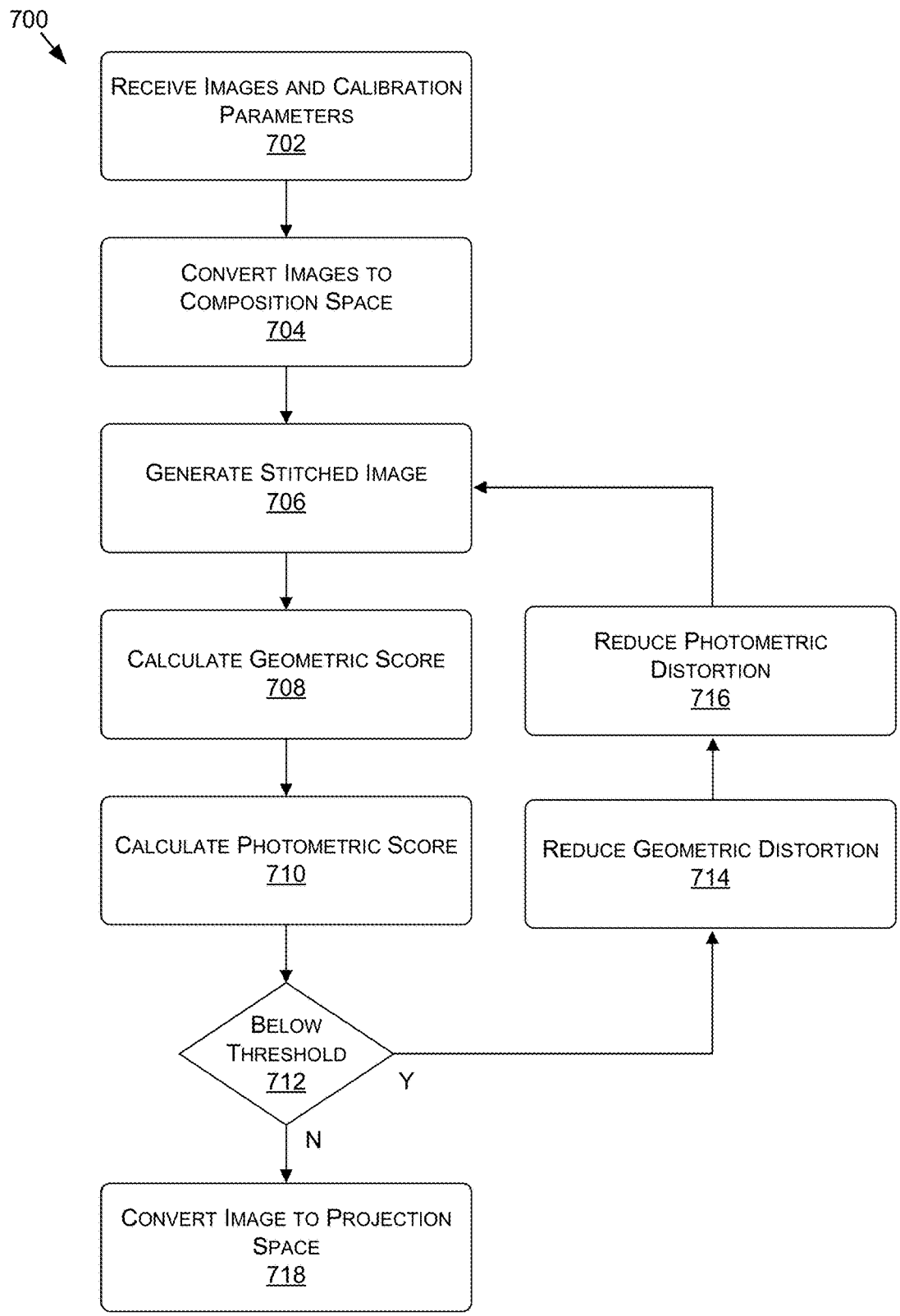
FIG. 7 illustrates a process to perform improved composition using composition quality optimization, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 700 is described, by way of example, with respect to the video and/or image composition pipeline of FIG. 1 as performed by a surround view system in automotive applications. However, these methods may additionally or alternatively be executed by any one system, or any combination of systems, including, but not limited to, those described herein.

FIG. 7 is a flow diagram showing a method 700 for performing improved image composition using composition quality optimization, in accordance with some embodiments of the present disclosure. In the method 700 at block 702, a composition module or composition pipeline receives two or more images from two or more cameras as well as calibration parameters associated with the two or more cameras used to generate the two or more images, as described above in conjunction with FIG. 1.

At block 704, the composition module or composition pipeline converts each input image to composition space, as described above in conjunction with FIG. 3, and at block 706 generates an initial stitched image. In an embodiment, blocks 704 and 706 are combined and a stitched image is generated 706 as a result of converting two or more images to composition space 704. In another embodiment, blocks 704 and 706 are performed independently and a stitched image is generated 706 by a composition module or composition pipeline after two or more 2D input images are converted to composition space 704. In an embodiment, the composition module or composition pipeline transforms two or more 2D input images into a single 3D virtual camera or stitched space using forward or reverse mapping. In another embodiment, the composition module or composition pipeline transforms two or more 2D input images into a single 2D image.

At block 708, a quality assessment block of the composition module calculates a geometric score using various techniques described above in conjunction with FIG. 6. At block 710, a quality assessment block of the composition module calculates a photometric score using various techniques described above in conjunction with FIGS. 5 and 6. Based on the geometric score and/or the photometric score calculated at blocks 708 and 710, a quality score validation block determines if either of the geometric score and/or the photometric score are below one or more threshold values. If neither the geometric score nor the photometric score are below 712 one or more threshold values, the composition module or composition pipeline converts the resulting stitched image to projection space at block 718, as described above in conjunction with FIG. 3.

If the geometric score is below a threshold value 712, a composition module reduces geometric distortion at block 714 by calculating an optimal 3D geometric transformation, as described above in conjunction with FIG. 5. If the photometric score is below a threshold value 712, the composition module reduces photometric distortion at block 716 by applying one or more optimal photometric transforms, as described above in conjunction with FIG. 5.

Example Autonomous Vehicle

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more CPU(s), system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, and/or to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) 846 (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the location of the vehicle 800, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824, which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 800 (e.g., front-facing cameras) may be used for surround view, to help identify forward-facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that includes portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned around the vehicle 800. The surround camera(s) 874 may include wide-view camera(s) 870, fisheye camera(s), 360-degree camera(s), and/or the like. For example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround-view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
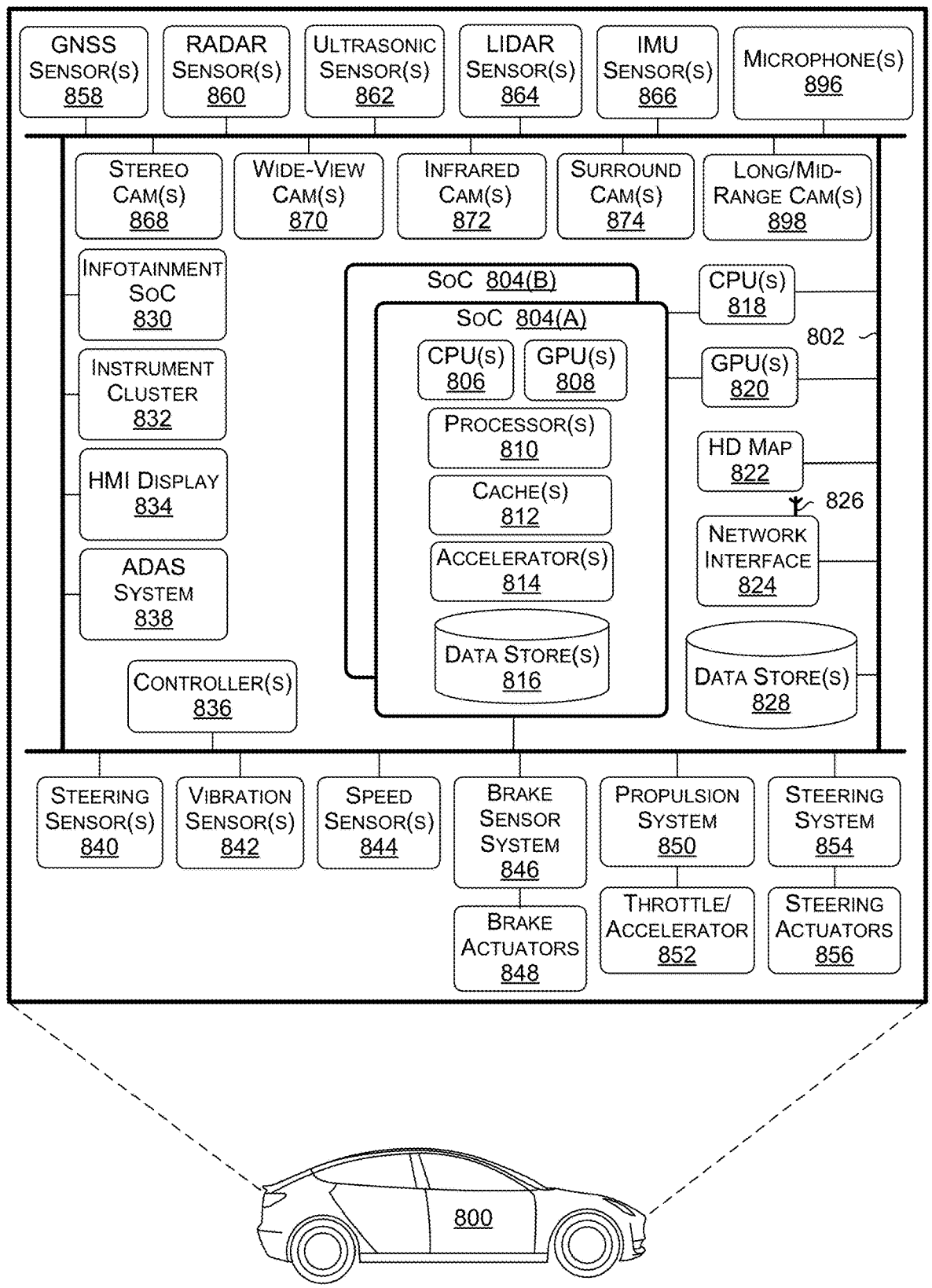
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C is illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800 and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use computer-based application programming interface(s)

(API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting, and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected to both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 816 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe-stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and actively performing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always-on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, which use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include an SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828, which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data, in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 800 at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 100 m, with an accuracy of 2 cm-3 cm, and with support for a 100 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include an SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjusts the vehicle speed to maintain a safe distance from vehicles ahead. Lateral ACC performs distance keeping, and advises the vehicle 800 to change lanes when necessary. Lateral ACC is related to other ADAS applications such as LC and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 800), while the I2V communication concept provides information about traffic farther ahead. CACC systems may include either or both I2V and V2V information sources. Given the information of the vehicles ahead of the vehicle 800, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network that is trained and thus reduces the risk of false positives, as described herein.

The vehicle 800 may further include the infotainment SoC 830 (e.g., an in-vehicle infotainment system (IVI)). Although illustrated and described as an SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 800. For example, the infotainment SoC 830 may include radios, disk players, navigation systems, video players, USB and Bluetooth connectivity, carputers, in-car entertainment, Wi-Fi, steering wheel audio controls, hands-free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe-stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
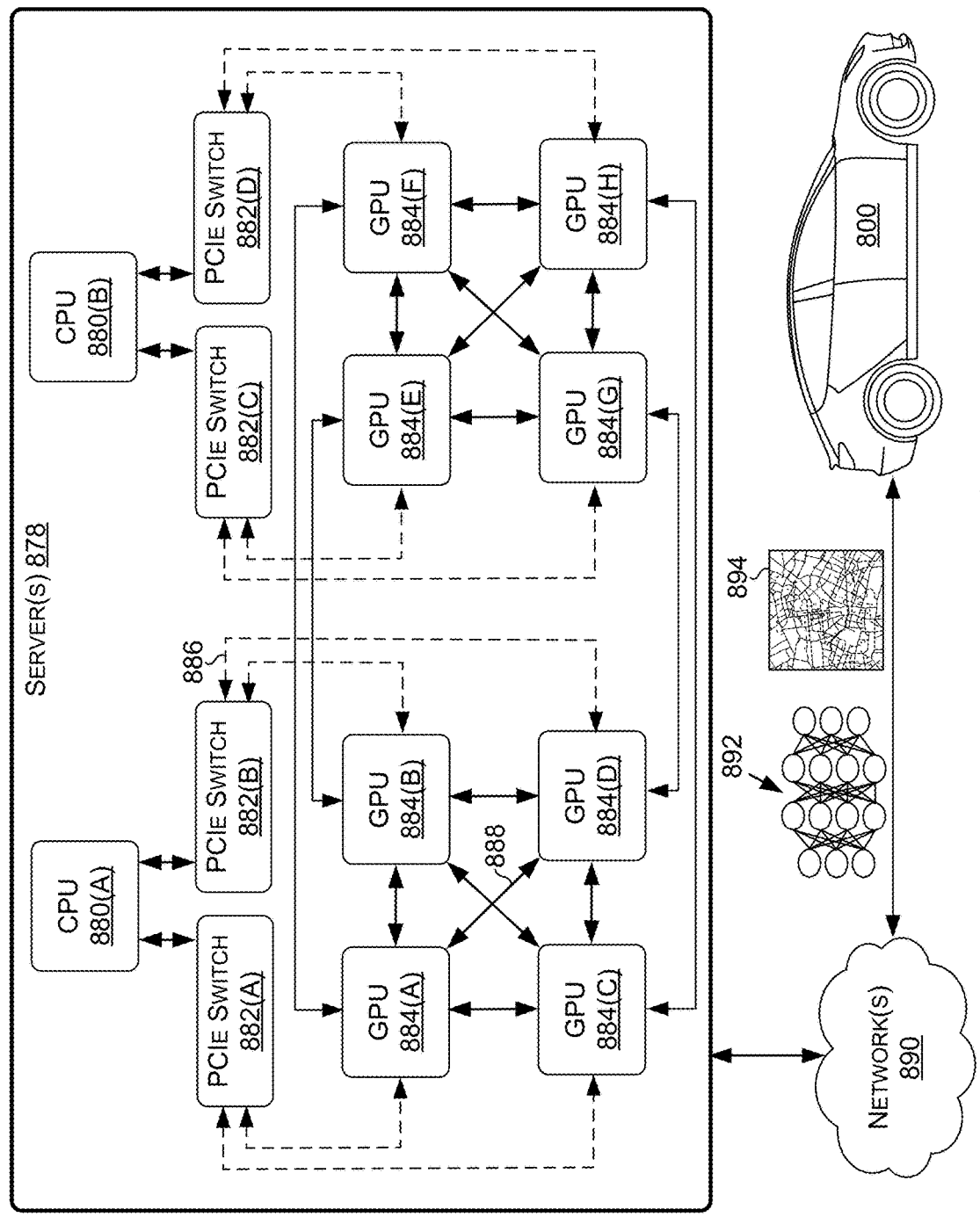
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced roadwork. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
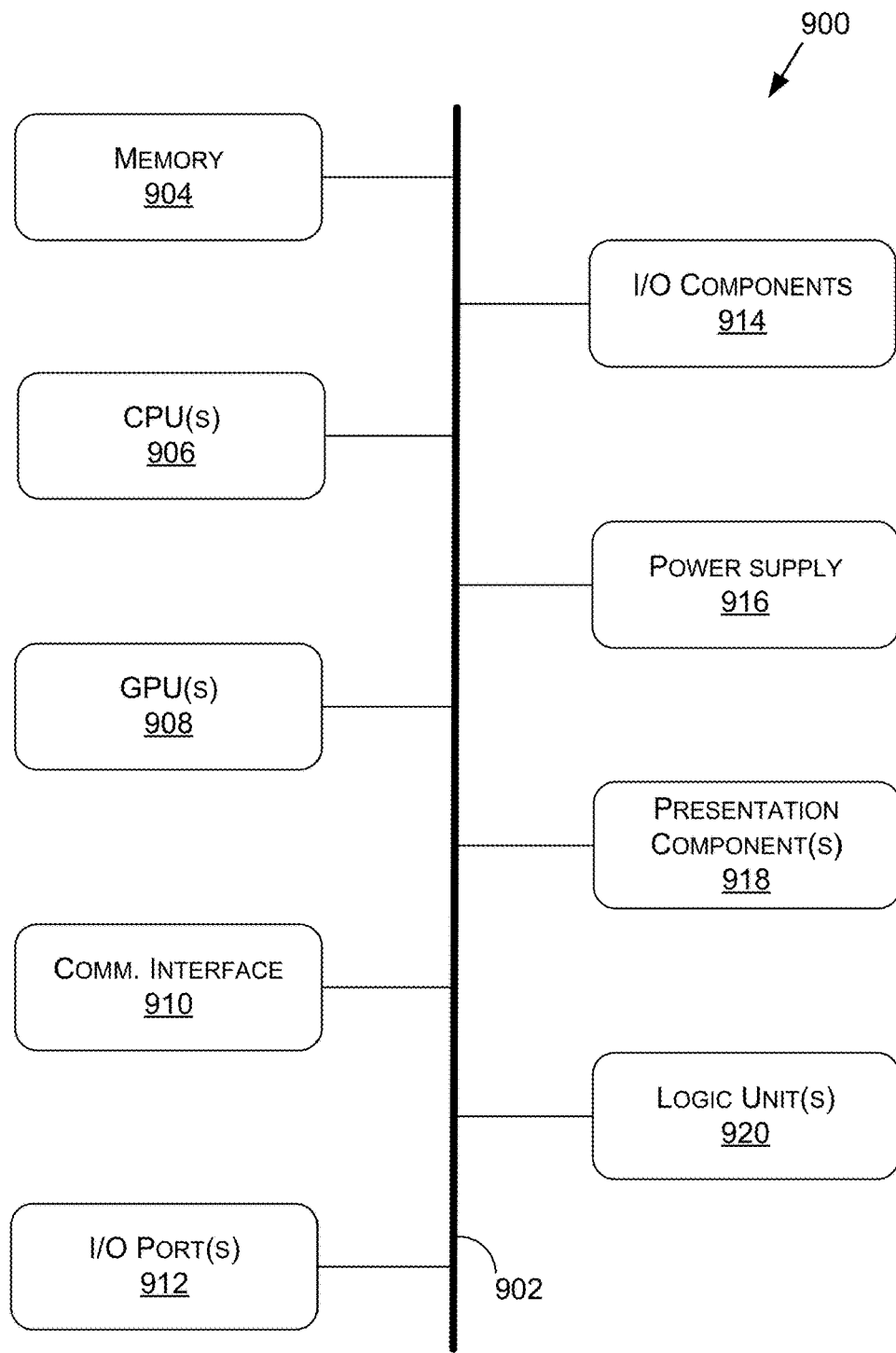
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, I/O ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet,"

"client device," "mobile device," "hand-held device," "game console," "electronic control unit (ECU)," "virtual reality system," "augmented reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point, connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, including wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built into (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
  determining photometric and geometric differences between a first image and a second image in an overlap region between the first and second images;
  applying a first transformation to at least the overlap region between the first and second images to integrate temporal consistency into at least one of the photometric difference or the geometric difference; and
  applying a second transformation to at least the first image, the second transformation comprising at least one of a photometric transformation based at least in part on the photometric difference or a geometric transformation based at least in part on the geometric difference.

2. The method of claim 1, further comprising:
  determining whether the second transformation comprises the geometric transformation based at least in part on a first comparison of the geometric difference to a first threshold value; and
  determining whether the second transformation comprises the photometric transformation based at least in part on a second comparison of the photometric difference to a second threshold value.

3. The method of claim 1, further comprising combining the first image and the second image into a third image based, at least in part, on the overlap region.

4. The method of claim 1, wherein the geometric difference comprises at least one geometric quality score quantifying at least one error in alignment of the first image with the second image in the overlap region.

5. The method of claim 1, wherein the photometric difference comprises at least one photometric quality score quantifying differences in color level in the first and second images within the overlap region.

6. The method of claim 1, further comprising:
computing a geometric quality score quantifying at least one error in alignment of the first image with the second image in the overlap region, the geometric difference comprising the geometric quality score;
performing a comparison of the geometric quality score to a threshold value; and
determining the second transformation comprises the geometric transformation based on the comparison.

7. The method of claim 1, further comprising:
computing at least one photometric quality score quantifying differences in color level in the first image and the second image within the overlap region;
performing a comparison of the photometric quality score to a threshold value; and
determining the second transformation comprises the photometric transformation based on the comparison.

8. The method of claim 1, further comprising:
capturing the first image with a first image capture device of a machine comprising at least one of a vehicle or a robot;
capturing the second image with a second image capture device of the machine; and
displaying by a display device of the machine a stitched image generated based, at least in part, on at least the transformed first image, wherein the machine comprises one or more processors, and memory comprising instructions executable by the one or more processors to cause the one or more processors to perform the determining of the photometric and geometric differences and the applying of the first and second transformations.

9. A vehicle system comprising:
one or more processors; and
memory comprising instructions that, when performed by the one or more processors, cause the vehicle system to at least:
compute a score indicating at least one of photometric difference or geometric difference between a first image and a second image in an overlap region between the first and second images;
apply a first transformation to at least the overlap region between the first and second images to integrate temporal consistency into the score; and
apply a second transformation to at least the first image based, at least in part, on the score, the second transformation comprising at least one of a photometric transformation or a geometric transformation.

10. The vehicle system of claim 9, wherein the memory further comprises instructions that, in response to being performed by the one or more processors, cause the vehicle system to:
determine whether the second transformation comprises the geometric transformation based at least in part on a first comparison of the geometric difference to a first threshold value; and
determine whether the second transformation comprises the photometric transformation based at least in part on a second comparison of the photometric difference to a second threshold value.

11. The vehicle system of claim 9, wherein:
the first image is associated with a first time and a third image is associated with a second time; and
the score indicates photometric and geometric differences between the first image and the third image.

12. The vehicle system of claim 9, wherein the memory further comprises instructions that, in response to being performed by the one or more processors, cause the vehicle system to:
compute the score based, at least in part, on an optical flow vector usable to facilitate identification of one or more object differences between the first image and the second image in the overlap region; and
apply one or more geometric transforms to at least the first image as a result of the one or more object differences.

13. The vehicle system of claim 9, wherein the memory further comprises instructions that, in response to being performed by the one or more processors, cause the vehicle system to:
compute the score based, at least in part, on one or more color differences between each color channel of the first image and the second image in the overlap region; and
apply one or more photometric transforms to the first image or the second image as a result of the one or more color differences.

14. The vehicle system of claim 9, wherein the memory further comprises instructions that, in response to being performed by the one or more processors, cause the vehicle system to:
infer a second score from the score using one or more neural networks; and
transform at least the first image based, at least in part, on the second score.

15. The vehicle system of claim 9, wherein the memory further comprises instructions that, in response to being performed by the one or more processors, cause the vehicle system to combine the first image and the second image into a third image based, at least in part, on the overlap region.

16. The vehicle system of claim 9, wherein the memory further comprises instructions that, in response to being performed by the one or more processors, cause the vehicle system to:
compute a second score as a result of applying the second transformation to at least the first image;
compute one or more transforms to be applied to at least the first image based, at least in part, on the second score; and
apply the one or more transforms to at least the first image.

17. The vehicle system of claim 9, wherein the memory further comprises instructions that, in response to being performed by the one or more processors, cause the vehicle system to combine the first image and the second image into a third image based, at least in part, on the overlap region as a result of the score being above a threshold value.

18. The vehicle system of claim 9, further comprising: one or more controllers;
a network interface;
a display;
a propulsion system; and
two or more surround cameras usable to capture the first image and the second image.

19. A robotic system comprising:
one or more processors coupled to computer-readable media;
the computer-readable media storing executable instructions that, as a result of being executed by the one or more processors, cause the system to:
compute a score indicating at least one of photometric difference or geometric difference between a first image and a second image in an overlap region between the first and second images;
apply a first transformation to at least the overlap region between the first and second images to integrate temporal consistency into the score; and
apply a second transformation to at least the first image based, at least in part, on the score, the second transformation comprising at least one of a photometric transformation or a geometric transformation.

20. The robotic system of claim 19, wherein the computer-readable media further comprises instructions which, if performed by the one or more processors, cause the one or more processors to:
compute a second score as a result of applying a second transformation to at least the first image; and
compute one or more transforms to be applied to at least the first image based, at least in part, on the second score; and
apply the one or more transforms to at least the first image.

21. The robotic system of claim 19, wherein the computer-readable media further comprises instructions which, if performed by the one or more processors, cause the one or more processors to:
infer a second score from the score using one or more neural networks; and
transform at least the first image based, at least in part, on the second score.

22. The robotic system of claim 19, wherein the computer-readable media further comprises instructions which, if performed by the one or more processors, cause the one or more processors to:
apply one or more three-dimensional transforms to at least the first image as a result of the second transformation comprising the geometric transformation.

23. The robotic system of claim 19, wherein the computer-readable media further comprises instructions which, if performed by the one or more processors, cause the one or more processors to:
compute the score based, at least in part, on one or more color differences between the first image and the second image; and
adjust one or more color parameters of at least the first image as a result of the one or more color differences.

24. The robotic system of claim 19, wherein the computer-readable media further comprises instructions which, if performed by the one or more processors, cause the one or more processors to:
transform at least the first image into a third image;
determine a second overlap region corresponding to a second overlap between a fourth image and a fifth image;
compute a second score indicating photometric and geometric differences between the fourth image and the fifth image in the second overlap region;
transform at least the fourth image into a sixth image based, at least in part, on the second score; and
combine the third image and the sixth image to create video data.

25. The robotic system of claim 19, wherein the computer-readable media further comprises instructions which, if performed by the one or more processors, cause the one or more processors to:
determining whether the second transformation comprises the geometric transformation based at least in part on a first comparison of the geometric difference to a first threshold value; and
determining whether the second transformation comprises the photometric transformation based at least in part on a second comparison of the photometric difference to a second threshold value.

26. The robotic system of claim 19, wherein:
the first image is associated with a first time and a third image is associated with a second time in a time interval; and
the score indicates temporal differences between the first image and the third image in the time interval.

27. The robotic system of claim 19, further comprising:
one or more robotic arms;
one or more servo controllers;
one or more sensors;
a communication interface; and
two or more cameras usable to capture at least the first image and the second image.

28. The method of claim 1, wherein the photometric difference is determined based, at least in part, on a color intensity score and a color angle score.

29. The method of claim 1, wherein the geometric difference is based on at least one of high frequency structural similarity index measure, perceptual quality significance map, root mean square error, and peak signal to noise ratio.

* * * * *